US006895444B1

(12) United States Patent
Weisshaar et al.

(10) Patent No.: US 6,895,444 B1
(45) Date of Patent: *May 17, 2005

(54) SERVICE FRAMEWORK WITH LOCAL PROXY FOR REPRESENTING REMOTE SERVICES

(75) Inventors: Bernhard Weisshaar, Phoenix, AZ (US); Merlin Smith, Chandler, AZ (US); Parvathy Bhaskaran, Mesa, AZ (US); Mark Clayton, Phoenix, AZ (US); Kungwel Mike Liu, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 846 days.

This patent is subject to a terminal disclaimer.

(21) Appl. No.: 09/663,278
(22) Filed: Sep. 15, 2000
(51) Int. Cl.$^7$ .................... G06F 15/16; G06F 15/167
(52) U.S. Cl. ............................ 709/250; 709/203
(58) Field of Search ............................ 709/202, 203, 709/250; 707/104.1

(56) References Cited

U.S. PATENT DOCUMENTS

| | | | | |
|---|---|---|---|---|
| 5,673,322 A | * | 9/1997 | Pepe et al. | 705/52 |
| 5,903,725 A | * | 5/1999 | Colyer | 709/203 |
| 6,038,625 A | * | 3/2000 | Ogino et al. | 710/104 |
| 6,226,690 B1 | * | 5/2001 | Banda et al. | 719/315 |
| 6,510,550 B1 | * | 1/2003 | Hightower et al. | 717/108 |
| 6,580,916 B1 | * | 6/2003 | Weisshaar et al. | 455/456.1 |
| 6,587,877 B1 | * | 7/2003 | Douglis et al. | 709/224 |
| 6,622,175 B1 | * | 9/2003 | Piller | 719/313 |
| 2001/0039565 A1 | * | 11/2001 | Gupta | 709/203 |
| 2003/0177170 A1 | * | 9/2003 | Glass | 709/203 |

FOREIGN PATENT DOCUMENTS

| WO | WO 99/44127 A1 | 9/1999 |
|---|---|---|
| WO | WO 00/54151 A2 | 9/2000 |

OTHER PUBLICATIONS

"Specification of the Bluetooth System, Profiles, Version 1.0 B, Service Discovery Application Profile", Bluetooth Specification, Dec. 1, 1999, XP002176976, pp. 62–93.
Barbeau M., "Service Discovery in a Mobile Agent API Using SLP", Global Telecommunications Conference—Globecom '99, XP010373332, pp. 391–395.

* cited by examiner

Primary Examiner—Larry D. Donaghue

(57) ABSTRACT

In an information appliance system 100, a user device 108 comprises a client platform (200, FIG. 5) that includes a service framework (235, FIG. 5) to discover and connect with a variety of services, both remote and local, transient and persistent, and to disconnect from them when they are no longer of interest or become unavailable. The service framework 235 provides a standard, consistent, simplified way for services to make themselves available and for service-using entities to locate and connect with the services of interest to them. From the perspective of the client platform 200, all services, whether local or remote, are presented as local services to the application. Each remote service is represented as a local service through the use of a local proxy that insulates the service user from the complexities of communicating with a remote server. Various methods of operating a service framework are also described.

15 Claims, 11 Drawing Sheets

SERVICE FRAMEWORK WITH LOCAL PROXY FOR REPRESENTING REMOTE SERVICES

RELATED INVENTIONS

This invention is related to the following inventions which are assigned to the same assignee as the present invention and which were filed on even date herewith:

Ser. No. 09/682,439, entitled "Service Framework Supporting Remote Service Discovery and Connection", now U.S. Pat. No. 6,757,262;

Ser. No. 09/663,523, entitled "Service Framework with Just-in-Time Look-Up", still pending;

Ser. No. 09/663,522, entitled "Service Framework with Consolidation of Local and Remote Services", still pending;

Ser. No. 09/662,307, entitled "Service Framework for Evaluating Remote Services Based Upon Transport Characteristics", now U.S. Pat. No. 6,580,916; and Ser. No. 09/662,441, entitled "Service Framework With Hidden Services", still pending.

FIELD OF THE INVENTION

This invention relates generally to communications systems and, in particular, to methods and apparatus for providing services to wireless equipment in a wireless communications system.

BACKGROUND OF THE INVENTION

There is an ever increasing demand for wireless communications. Wireless subscribers desire to have access to information at any time and at any place. One of the fastest growing markets for providing wireless services is known as "telematics" and entails delivering a wide spectrum of information via wireless links to vehicle-based subscribers. The information can originate from multiple sources, such as the Internet and other public, private, and/or government computer-based networks; wireless telecommunications such as cellular, Personal Communication Service (PCS), satellite, land-mobile, and the like; terrestrial and satellite direct broadcasts including traditional AM/FM bands, broadband, television, video, geolocation and navigation via a global position system (GPS), and the like; concierge services providing roadside assistance, emergency calling, remote-door unlocking, accident reporting, travel conditions, vehicle security, stolen vehicle recovery, remote vehicle diagnostics, and the like; advertising services identifying names and locations of businesses such as gas stations, restaurants, hotels, stores, and offices, and the like; tourist services such as points of interest, directions, hours of access, and the like; and many other sources that can provide information of any type. Many of the above services are not universally available, but rather they are transient in both the time and geoposition domains.

Information can be communicated to telematics devices over relatively long wireless links, such as from a satellite or terrestrial node, or from relatively short wireless or wired links, such as from in-vehicle equipment or from hand-held devices like PDAs, portable computers, cellular phones, and the like.

The services provided by telematics systems are not restricted to vehicle-based subscribers, and they can also be provided to subscribers at home, at work, or elsewhere. With so much mobility, the equipment located in the subscriber's vehicle, or the equipment carried by or otherwise serving a subscriber, needs a way to connect with the plethora of services that are potentially available to it. The equipment needs a way to discover, identify, select, and invoke services that are of interest to it, as well as to disconnect from services that are no longer of interest to it.

It is known in the prior art to utilize certain commercially available software to locate services. However, systems utilizing such software are fixed, not mobile. Mobile systems require connection software that is specifically designed to fulfill requirements that distinguish mobile systems from fixed systems. For example, mobile systems often have limited battery power, limited bandwidth, limited memory, and only stay in any given place for a limited time.

Mobile systems also may have rigorous security requirements in order to protect the identify and location of mobile subscribers, as well as to insure that the mobile equipment, including software, is not involuntarily altered or corrupted, for example, by downloading uncertified software that could replace, infect, or otherwise have an adverse impact upon the software residing in the system. Known systems that dynamically provide access to services typically download software code to the client platform and execute the code on the client platform. Not only does this introduce potentially dangerous security issues, but the downloaded code can overwhelm the mobile system's limited memory capability.

It is known in the art for applications residing on a client platform to individually locate any desired service. For example, this can be done using the Jini™ connection technology commercially available from Sun Microsystems, Inc., Palo Alto, Calif. However, it can be an undesirable drain upon the applications, their platform, and the bandwidth available to the platform, for each application to independently interact with a desired service. Further, the need to interact differently with local or remote services requires additional complexity in the client platform.

Accordingly, there is a significant need for methods and apparatus that are more conserving of application and platform resources, particularly for mobile platforms.

There is also a significant need for methods and apparatus that make services appear the same to applications and platform resources, irrespective of where the services reside.

There is further a significant need for methods and apparatus that insulate applications from the complexities of interacting with remote servers to connect with remote services.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

The present invention is a distributed communications system with software components running on mobile client platforms and on remote server platforms.

Figure 1:
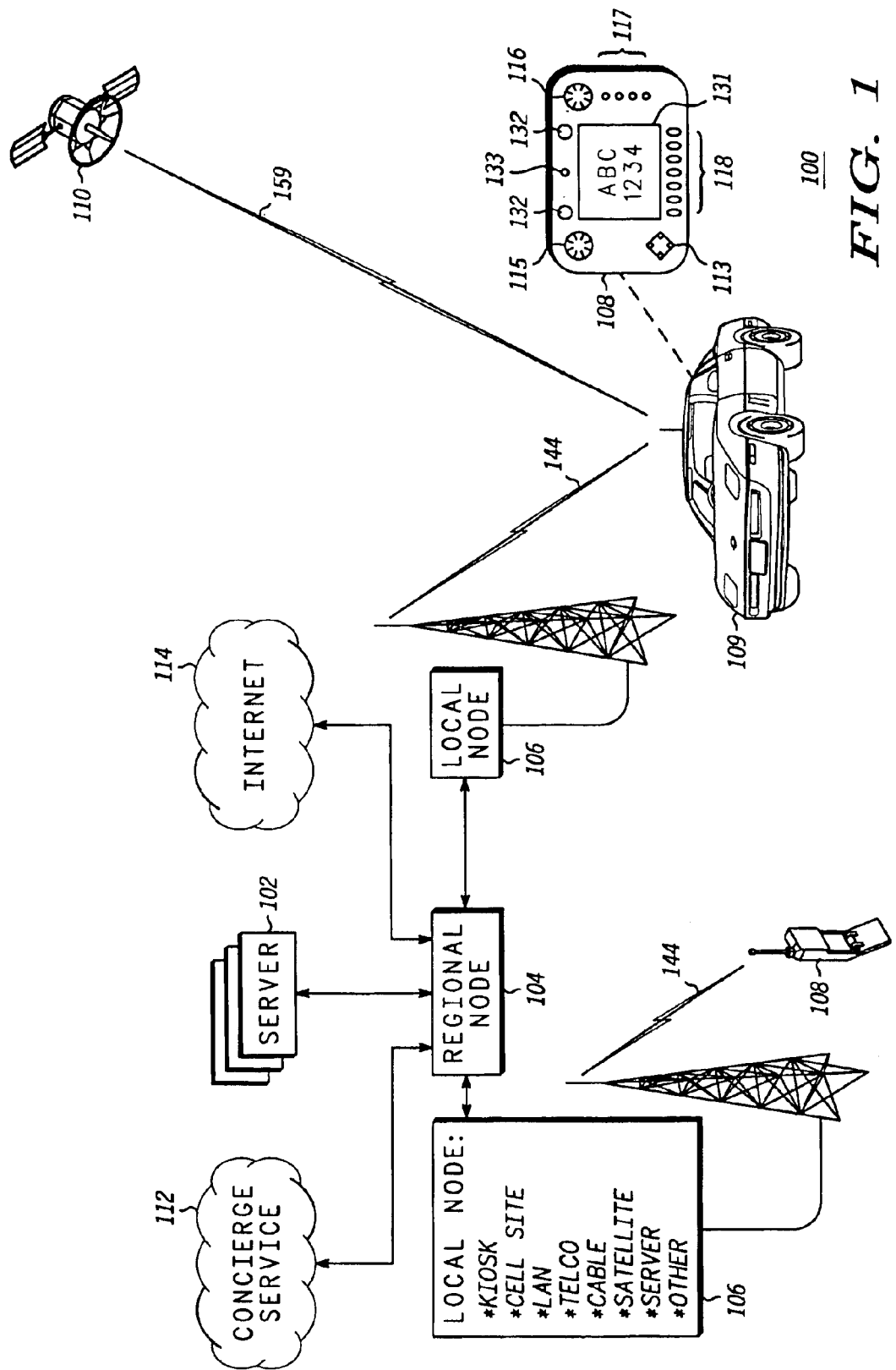
FIG. 1 depicts an exemplary information appliance system, according to one embodiment of the invention.

FIG. 1 depicts an exemplary information appliance system 100, according to one embodiment of the invention. Shown in FIG. 1 are examples of components of an information appliance system 100, which comprises a plurality of servers 102 coupled to a regional node 104, and a plurality of local nodes 106 coupled to regional node 104. There can be any number of servers 102, regional nodes 104, and local nodes 106 within the information appliance system 100. The regional node 104 can be coupled to a network, such as the Internet 114, and to any number of concierge services 112.

Servers 102, while illustrated as coupled to regional node 104, could be implemented at any hierarchical level(s) within information appliance system 100. For example, servers 102 could also be implemented within one or more local nodes 106, concierge service 112, and Internet 114.

Without limitation, local node 106 can be a kiosk, cell site, local area network (LAN), telephone company, cable company, satellite, or any other information service, structure, or entity that can transmit, receive, and/or communicate information. An information service can be any desired service including, but not limited to, telecommunications, broadband communications, entertainment, television, radio, recorded music, movies, computer-based games, Internet, and other types of public, private, personal, commercial, government, and military communications.

Local node 106 is coupled to any number of user nodes 108 via wireline or wireless interface means. In the embodiment depicted in FIG. 1, user nodes 108 can transmit and receive information using wireless communications means. User nodes 108 without limitation can include a wireless unit such as a cellular or Personal Communication Service (PCS) telephone, a pager, a hand-held computing device such as a personal digital assistant (PDA) or Web appliance, or any other type of communications and/or computing device. Without limitation, one or more user nodes 108 can be contained within, and optionally form an integral part of a vehicle, such as a car 109, truck, bus, train, aircraft, or boat, or any type of structure, such as a house, office, school, commercial establishment, and the like. As indicated above, a user node 108 can also be implemented in a device that can be carried by the user of the information appliance system 100.

In one embodiment, a user node 108 comprises an in-vehicle information appliance comprising various human interface (H/I) elements such as a display 131, a multi-position controller 113, one or more control knobs 115 and 116, one or more indicators 117 such as bulbs or light emitting diodes (LEDs), one or more control buttons 118, one or more speakers 132, a microphone 133, and any other H/I elements required by the particular applications to be utilized in conjunction with the information appliance.

User nodes 108 can also transmit and/or receive data to and from devices and services other than local node 106. For example, user nodes 108 can transmit and receive data to and from a satellite 110.

The information appliance system 100 including the user nodes 108 is capable of utilizing audio data in any number of encoding methods from any number of sources that include, but are not limited to, ADPCM (adaptive differential pulse-code modulation); CD-DA (compact disc-digital audio) digital audio specification; and ITU (International Telecommunications Union) Standards G.711,G.722,G.723 & G.728.

The information appliance system 100 including the user nodes 108 is capable of utilizing video data in any number of encoding methods from any number of sources that include, but are not limited to, ITU Standards H.261 & H.263; Motion JPEG (Joint Photographic Experts Group); and MPEG-1, MPEG-2 and MPEG-4 (Motion Picture Experts Group) standards.

Additionally, the information appliance system 100 is capable of utilizing audio and video data in any number of formats and using any type of transport technology that include, but are not limited to, USB (Universal Serial Bus); IEEE (Institute of Electrical and Electronics Engineers) Standards 1394-1995; and IEEE 802.11; and using protocols such as HTTP (hypertext transfer protocol); TCP/IP (transmission control protocol/Internet protocol); and UDP/IP (user datagram protocol/Internet protocol).

Figure 2:
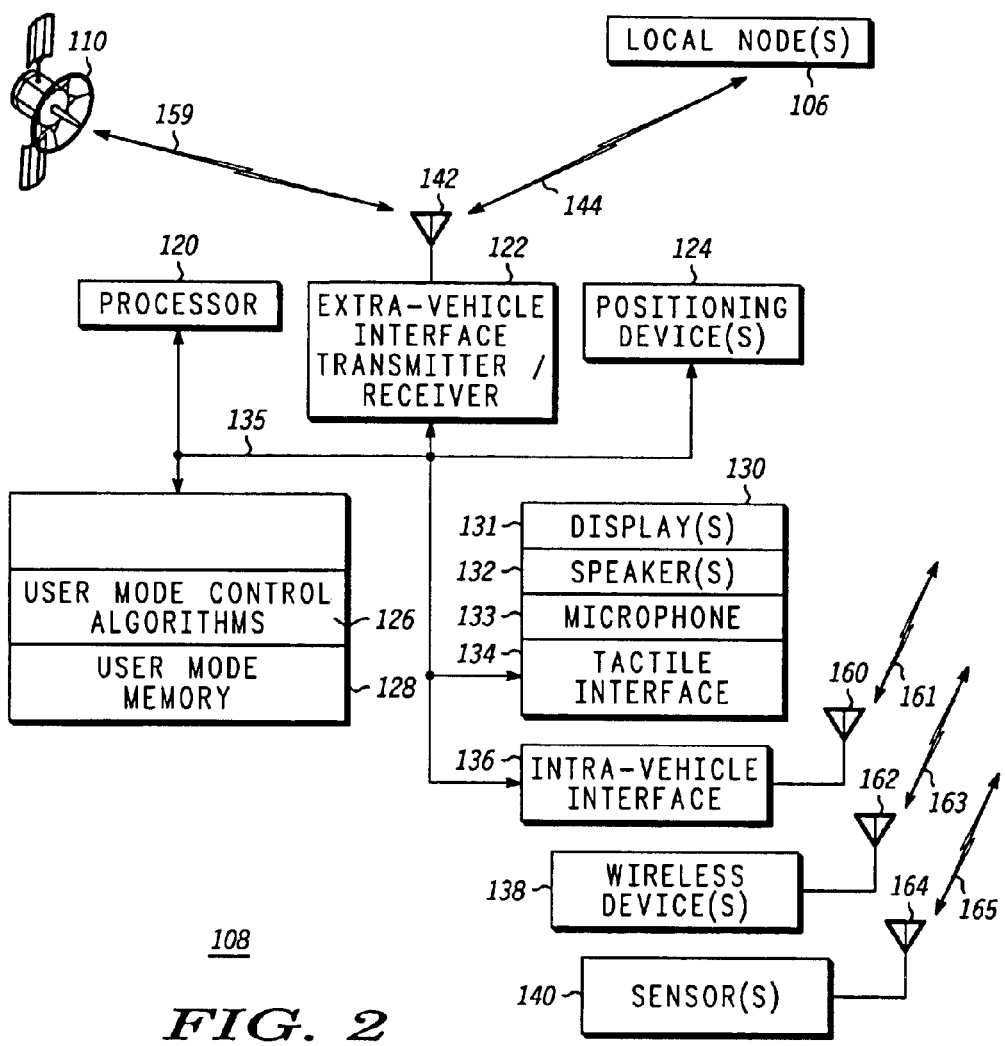
FIG. 2 depicts a user node of an exemplary information appliance system.

FIG. 2 depicts a user node 108 of an exemplary information appliance system 100. As indicated above, user node 108 can without limitation be located within or be an integral part of any vehicle, such as an automobile, truck, bus, train, aircraft, or boat, or be carried with a user, or be located in a stationary location or structure, and the like. As shown in FIG. 2, the user node 108 comprises a processor 120 with associated user node memory 128. User node memory 128 comprises user node control algorithms 126. User node memory 128 can include, but is not limited to, random access memory (RAM), read only memory (ROM), flash memory, and other memory such as a hard disk, floppy disk, and/or other appropriate type of memory. User node 108 can initiate and perform communications with other nodes shown in FIG. 1 in accordance with suitable computer programs, such as user node control algorithms 126, stored in user node memory 128.

User node 108 also comprises a user interface device 130 that can include without limitation a tactile interface 134, microphone 133, speakers 132, any number of displays 131, and the like.

User node 108 also comprises an extra-vehicle interface 122, typically implemented as a transmitter/receiver for transmitting and receiving communications via a wireless link 144 among the various nodes depicted in FIG. 1. Extra-vehicle interface 122 also facilitates communications among other devices via wireless link 159, for example, satellite 110, and the like. Communications are transmitted and received through one or more antennas 142 of any type, which can include any one or combination of a fixed, steerable, omni-directional, or phased array antenna. Steerable antenna can include, but is not limited to, an electronically steerable antenna, physically steerable antenna, and the like. User node 108 can also include positioning devices 124 of any type, for example, global positioning system (GPS), gyroscope, compass, accelerometer, altimeter, rate sensors, and other positioning devices 124 that can define the position, attitude, and/or motion vector of the user node 108.

User node 108 can also comprise an intra-vehicle interface 136, which can include antenna 160. Intra-vehicle interface 136 can include multiple types of transceivers (not shown) and antennas 160 to implement different short-range wireless protocols, such as Bluetooth™, IEEE wireless local area network (LAN) standard 802.11, and infrared. Intra-vehicle interface 136 is capable of short-range wireless communications, via wireless link 161, with other wireless devices 138 and sensors 140 of any type, for example, wireless telephones, computers, pagers, PDA's, entertainment devices, printers, fax machines, wireless local networks such as Bluetooth™, vehicle sensors, vehicle actuators, vehicle displays, and the like. In addition, intra-vehicle interface 136 can be used to communicate with wireless devices that are physically outside the vehicle but close to the vehicle, such as a service station kiosk. One or more wireless devices 138 can comprise one or more antennas such as antenna 162 and communicate via wireless link 163. One or more sensors 140 can comprise one or more antennas such as antenna 164 and communicate via wireless link 165.

In one embodiment, the various components and systems in FIG. 2 can communicate with each other via a wireline link 135, for example, a power/data/control bus, and the like. In another embodiment, some of the various components and systems in FIG. 2 could communicate via a wireless link.

Figure 3:
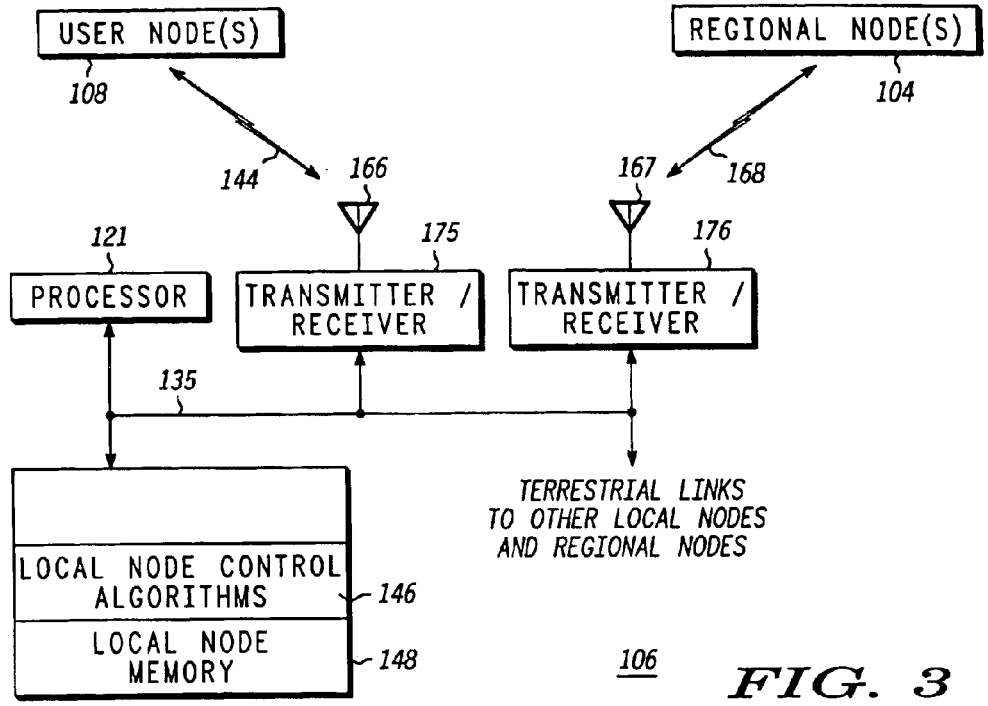
FIG. 3 depicts a local node of an exemplary information appliance system.

FIG. 3 depicts a local node 106 of an exemplary information appliance system 100. As shown in FIG. 3, the local node 106 comprises a processor 121 with associated local node memory 148. Local node memory 148 comprises local node control algorithms 146. Local node memory 148 can include, but is not limited to, random access memory (RAM), read only memory (ROM), and other memory such as a hard disk, floppy disk, and/or other appropriate type of memory. Local node 106 can initiate and perform communications with other nodes shown in FIG. 1 in accordance with suitable computer programs, such as local node control algorithms 146, stored in local node memory 148.

Local node 106 also comprises any number of transmitters/receivers 175 for transmitting and receiving communications via wireless link 144 to and from any number of user nodes 108. Communications are transmitted and received through antenna 166.

Local node 106 also comprises any number of transmitter/receivers 176 for transmitting and receiving communications via wireless link 168 to and from any number of regional nodes 104. Communications are transmitted and received through antenna 167. As shown in FIG. 3, the various components and systems can also communicate via terrestrial links such as wireline, radio frequency (RF), or optical links, and the like, with other local nodes 106 and regional nodes 104.

In one embodiment, the various components and systems in FIG. 3 can communicate with each other via a wireline link 135, for example, a power/data/control bus, and the like. In another embodiment, some of the various components and systems in FIG. 3 could communicate via a wireless link.

Figure 4:
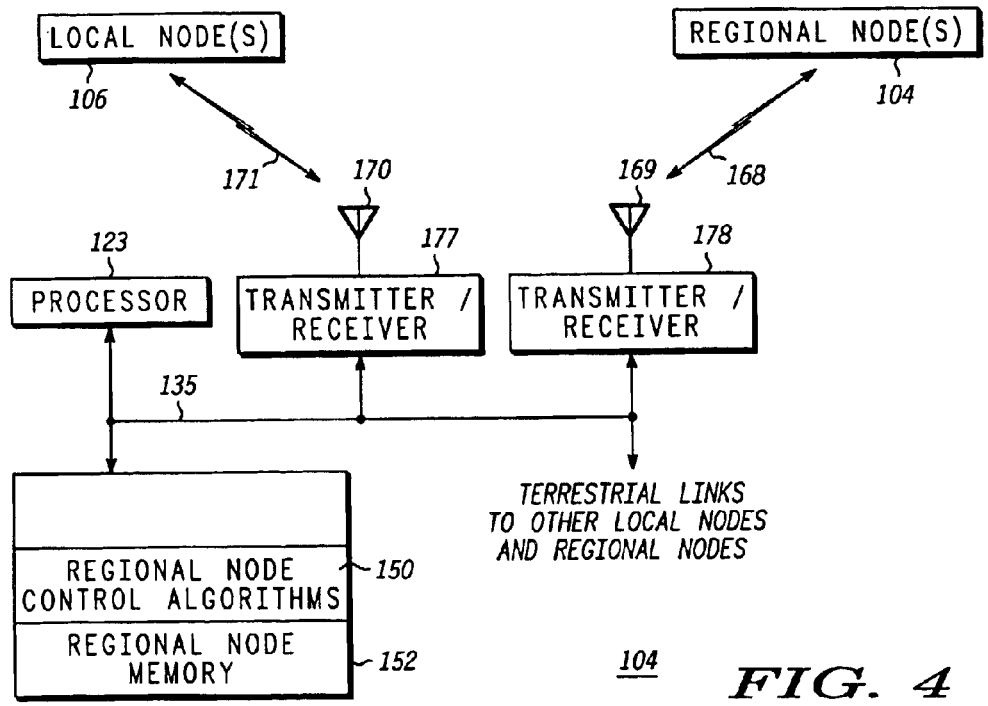
FIG. 4 depicts a regional node of an exemplary information appliance system.

FIG. 4 depicts a regional node 104 of an exemplary information appliance system 100. As shown in FIG. 4, the regional node 104 comprises a processor 123 with associated regional node memory 152. Regional node memory 152 comprises regional node control algorithms 150. Regional node memory 152 can include, but is not limited to, random access memory (RAM), read only memory (ROM), and other memory such as a hard disk, floppy disk, and/or other appropriate type of memory. Regional node 104 can initiate and perform communications with other nodes shown in FIG. 1 in accordance with suitable computer programs, such as regional node control algorithms 150, stored in regional node memory 152.

Regional node 104 also comprises any number of transmitters/receivers 177 for transmitting and receiving communications via wireless link 171 to and from any number of local nodes 106. Communications are transmitted and received through an antenna 170.

Regional node 104 also comprises any number of transmitters/receivers 178 for transmitting and receiving communications via wireless link 168 to and from any number of regional nodes 104, servers 102, and the like. Communications are transmitted and received through antenna 169. As shown in FIG. 4, the various components and systems can also communicate, via terrestrial links such as wireline, radio frequency (RF), or optical links, and the like, with other local nodes 106 and regional nodes 104.

In one embodiment, the various components and systems in FIG. 4 can communicate with each other via a wireline link 135, for example, a power/data/control bus, and the like. In another embodiment, some of the various components and systems in FIG. 4 could communicate via a wireless link.

In FIGS. 2–4, processors 120, 121, and 123, respectively, perform distributed, yet coordinated, control functions within information appliance system 100 (FIG. 1). Processors 120, 121, and 123 are merely representative, and information appliance system 100 can comprise many more processors within the distributed servers 102, regional nodes 104, local nodes 106, and user nodes 108.

Processors 120, 121, and 123 can be of any suitable type or types, depending upon the functional requirements of the overall information appliance system 100 and its constituent elements, including servers 102, regional nodes 104, local nodes 106, and user nodes 108.

Processors 120, 121, and 123 comprise portions of data processing systems that perform processing operations on computer programs that are stored in computer memory such as, but not limited to, user node memory 128, local node memory 148, and regional node memory 152. Processors 120, 121, and 123 also read data from and store data to memory, and they generate and receive control signals to and from other elements within information appliance system 100.

The particular elements of the information appliance system 100, including the elements of the data processing systems, are not limited to those shown and described, and they can take any form that will implement the functions of the invention herein described.

To provide an example of one context in which the present invention may be used, a brief overview of a client platform and a server platform, together with their associated software modules, will now be described. The present invention is not limited to implementation by any particular set of elements, and the description herein is merely representational of one embodiment. The specifics of one or more embodiments of the invention are provided below in sufficient detail to enable one of ordinary skill in the art to understand and practice the present invention.

Overview of Client Platform

Figure 5:
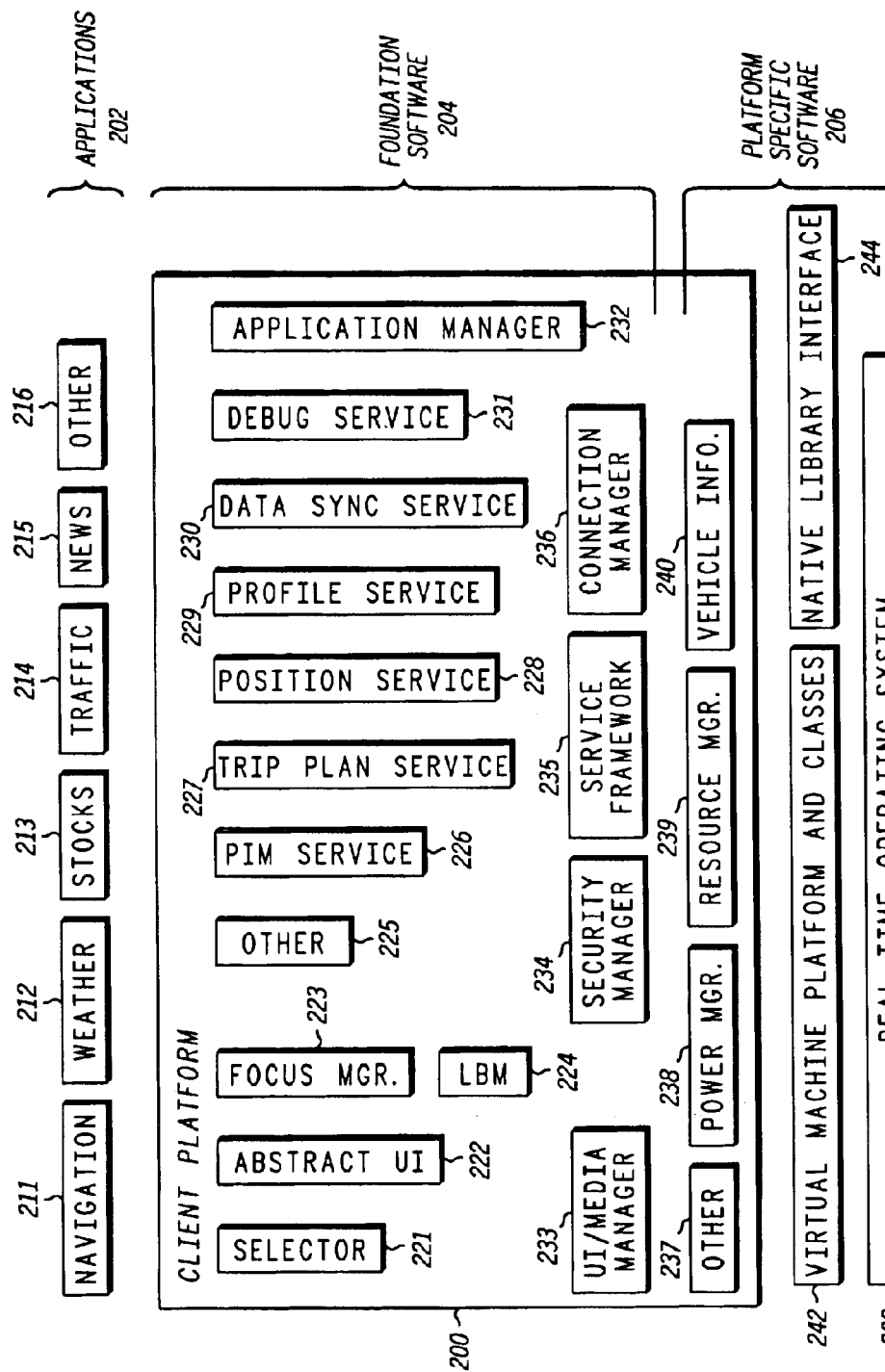
FIG. 5 illustrates major functional software blocks of a client platform, according to one embodiment of the invention.

FIG. 5 illustrates major functional software blocks of a client platform 200, in accordance with one embodiment of the invention. Architecturally, the user node 108 comprises a software-based client platform 200 that supports a wide range of applications and services. This provides great flexibility and allows the user platform's feature set to be readily expanded or updated after the user node 108 has been deployed into its intended market.

These software blocks are computer program modules comprising computer instructions, such as user node control algorithms 126, that are stored in a computer-readable medium such as user node memory 128. These software modules are merely representative of one embodiment of the invention. In other embodiments, additional modules could be provided as needed, and/or unneeded modules could be deleted.

The software blocks include the following modules, each of which is briefly summarized below according to its reference numeral in FIG. 5.

The client platform software comprises three general layers: applications 202, foundation software 204 upon which the applications 202 are supported, and platform-specific software 206. In one embodiment, the upper two layers are implemented in the Java™ programming language, available from various suppliers, including Sun Microsystems, Inc., Palo Alto, Calif. One advantage of the Java™ programming language is the support of code distribution in a platform-independent manner.

The lowest layer, i.e. the platform-specific software 206, comprises a real-time operating system 208, a virtual machine platform (such as the Java™ 2 Virtual Machine, available from Sun Microsystems, Inc.) and associated classes 242, and a native library interface 244.

Referring to FIG. 5, applications 202 can comprise an extremely wide variety of informational, safety, query, communications, entertainment, and other applications, for example navigation 211, weather 212, stocks 213, traffic 214, news 215, and others 216 of any type. As used herein, an "application" is defined as any computer program that provides one or more functions that are of interest to a user of the information appliance system 100.

Foundation software 204, in one embodiment, comprises the following modules, each of which will now be discussed.

Selector module 221 launches and controls applications selected by the user. It is user-configurable.

Abstract user interface (UI) 222 supports a wide variety of input/output (I/O) functions that enable the user to interact with the user device.

Focus manager 223 enforces priority-based access to UI and media resources. Focus manager 223 also controls interactions between synchronous applications and asynchronous notifications and alerts.

Logical button manager (LBM) 224 allows an application to map logical buttons to actual physical buttons on a user device. It allows physical buttons to be referenced by logical names. It manages different sets of buttons, such as pre-set buttons, application buttons, and so on.

Personal information manager (PIM) service 226 supports functions to enhance user productivity, such as an address book, a calendar, a memo management capability, and so forth. The address book can comprise information that is up-loaded from a PDA, entered by voice or by keys from the user, down-loaded from the Internet, and so forth.

Trip plan service 227 provides a variety of trip-planning functions, such as route and map retrieval, route-planning, determination of route distance, etc.

Position service 228 provides abstract positioning application programming interfaces (API) to support a variety of position-determining mechanisms, such as GPS, differential GPS, in-road transmitters, cellular base stations, etc.

Profile service 229 provides server-based profiles for users, devices, vehicles, etc. It assists in the application configuration. It can also ensure that user profiles are portable from one user vehicle to another.

Data sync service 230 synchronizes one or more databases on client platform 200 with counterpart databases on server platform 300.

Debug service 231 provides debug functions to isolate, examine, and correct errors in the operation of the software residing on the client platform 200.

Application manager 232 controls the installation and updating of applications, including security attributes of the applications.

User interface manager/media manager 233 manages the user interface, e.g. what entities can access what portions of a display screen (in the case of the user interface manager), and manages all aspects of audio and video functions, e.g. radio, voice-recognition, sound clips, etc. (in the case of the media manager).

Security manager 234 provides permission and policy restraints within the client platform 200.

Service framework 235, to which the current invention pertains, is responsible for locating, connecting, and controlling services required by applications 202 and other services. Additional description of the service framework 235 is provided elsewhere herein.

Connection manager 236 manages connection(s) of the client platform 200 to one or more networks, such as geographically distributed cellular and server networks. It ensures continuity of sessions across physical and/or logical network interfaces. It can require security (e.g. authentication, encryption, etc.) as a precondition to a connection. It can ensure that low bandwidth connections are used efficiently.

Other modules 225 can also be provided within the foundation software 204 of the client platform 200, depending upon the functional requirements of the client platform 200.

Platform specific software 206, in one embodiment, comprises the following modules, each of which will now be discussed.

Power manager 238 provides power status change events to applications, such as "power on", "power off", "sleep/accessory mode", etc. It can enforce a low-power mode in emergency situations, reserving power to the highest priority functions. It can also monitor power consumption to identify elements that may be consuming unreasonable amounts of power.

Resource manager 239 manages priority-based access to system resources, such as a processor, threads being processed, memory elements, and persistent storage. The resource manager 239 can ensure the required resources to support an emergency call by halting or suspending lower priority applications.

Vehicle information 240 provides information to support primarily mission-critical vehicular functions. It comprises information to control certain in-vehicle functions, such as remote door unlock. It comprises status information from the in-vehicle system, e.g. vehicular speed. It also can comprise information derived from integrated vehicle components, such as global positioning information from an in-vehicle GPS system.

Other modules 237 can also be provided within the platform specific software 206 of the client platform 200, depending upon the functional requirements of the client platform 200.

Overview of Server Platform

Figure 6:
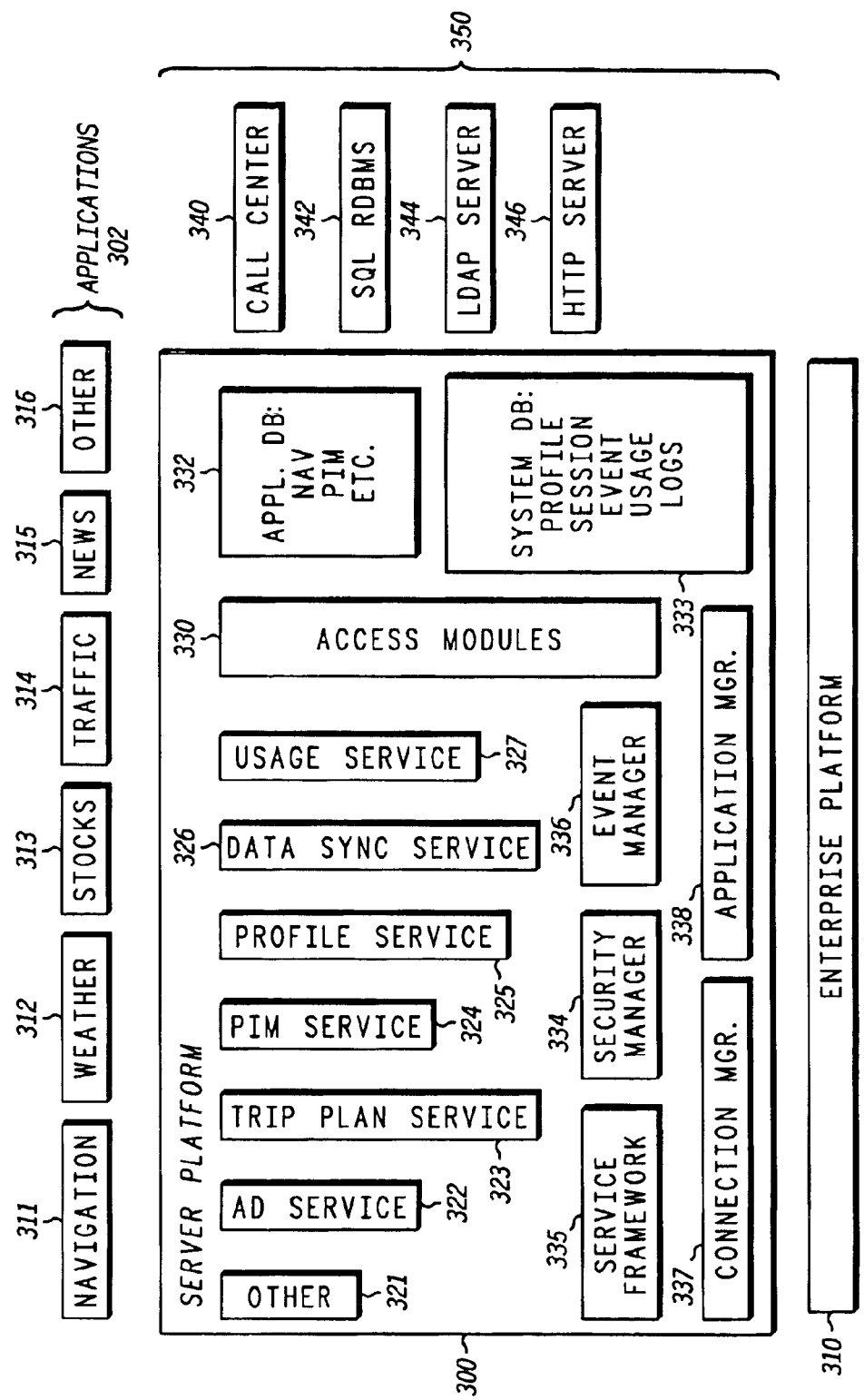
FIG. 6 illustrates major functional software blocks of a server platform, according to one embodiment of the invention.

FIG. 6 illustrates major functional software blocks of a server platform 300, in accordance with one embodiment of the invention. Architecturally, each server 102 (FIG. 1) comprises a software-based server platform 300 that supports a wide range of applications and services. This provides great flexibility and allows the server platform's feature set to be readily expanded or updated after the server 102 has been deployed into its intended market.

These software blocks are part of computer program modules comprising computer instructions, such as local node control algorithms 146 (FIG. 3), that are stored in a computer-readable medium such as local node memory 148. Additionally, or alternatively, they can be implemented as regional node control algorithms 150 (FIG. 4), which are stored in regional node memory 152.

These software modules are merely representative of one embodiment of the invention. In other embodiments, additional modules could be provided as needed, and/or unneeded modules could be deleted.

The software blocks include the following modules, each of which is briefly summarized below according to its reference numeral in FIG. 6.

The server platform software comprises three general layers: applications 302, middleware 350 upon which the applications 302 are supported, and enterprise platform 310. Enterprise platform 310 comprises software, including an operating system, that is specific to the particular server platform being used. Different servers 102 can utilize different server platforms 300.

Server platform 300 supports an extremely wide variety of informational, safety, query, communications, entertainment, and other applications 302, for example navigation 311, weather 312, stocks 313, traffic 314, news 315, and others 316 of any type. The application set supported by server platform 300 will typically be much broader than that supported by any one client platform 200.

The middleware 350 of server platform 300, in one embodiment, comprises the following modules, each of which will now be discussed.

Ad service 322 provides advertising related services, such as the availability and location of commercial businesses.

Trip plan service 323, PIM service 324, profile service 325, data sync service 326, security manager 334, connection manager 337, and application manager 338 perform similar functions to the corresponding modules previously discussed with reference to client platform 200 in FIG. 5.

Usage service 327 provides a logging service that tracks the usage of any desired service, module, or other element in the server platform 300.

Access modules 330 each provide a unique entry point for users into a corresponding database. Each database in the server platform 300 has one and only one entry point in the form of an access module 330. The access modules 330 provide a consistent programming interface to their using entities regardless of the underlying database technology.

Application databases 332 provide a variety of databases to support any application required in server platform 300. These can include, for example, databases to support navigation, personal information management (PIM) functions such as address books, and the like.

System databases 333 provide a variety of databases to support system functions within server platform 300. These can include, for example, profile data, session data, event data, and usage logs.

Service framework 335, to which the current invention pertains, is responsible for providing services required by applications 302. Additional description of the server platform service framework 325 is provided elsewhere herein.

Event manager 336 manages the creation and dispatching of server-side events that represent server activities in a generic way.

Call center 340 supports services requested of and responded to by a remote call center, such as a concierge center.

Structured query language (SQL) 342 is a database query language commercially available from various suppliers, including Oracle Corporation, Redwood Shores, Calif. The associated relational database management system (RDBMS) is a database management system commercially available from various suppliers, including Microsoft Corporation, Redmond, Wash.

LDAP (lightweight directory access protocol) server 344 provides a set of communications protocols for accessing information directories.

HTTP server 346 supports Internet accesses originated by a client platform 200 or by another server platform 300 on behalf of a client platform 200.

Other modules 321 can also be provided within the middleware 350 of the server platform 300, depending upon the functional requirements of the server platform 300.

Overview of Services

One purpose of this invention is to provide a system to allow a mobile client platform to discover and use services that become available dynamically within the client platform's environment. Many of the features of the present invention are facilitated by making remote services available to a mobile client platform.

The availability of some of these remote services is based on the physical proximity of the remote server to the vehicle. These types of remote services are typically accessed via a short-range wireless link that is established when the vehicle comes within range of a server, e.g. a kiosk at a gas station, and which are lost when the vehicle leaves the immediate area.

Other services, both local and remote, will be available regardless of the vehicle's location. Servers in the infrastructure can provide remote services over long-range links such as cellular. In addition, remote services may be provided by devices within the vehicle over short-range links, such as Bluetooth™. Local services may also be provided by devices that are directly wired in, such as an odometer or digital video disk (DVD). The present invention supports a wide number of interfaces to enable both short-range and long-range bidirectional and unidirectional communications links.

Services are a fundamental building block of the software architecture. They play a variety of roles and are found at all levels of the architecture. As used herein, a "service" is defined as an encapsulation of some functionality that is of use to one or more service-using entities (current or anticipated) or that needs to be isolated from the service-using entity for some reason. A service may provide access to information or perform some computation. Or it may provide access to a hardware capability such as a communications link or other device.

A client application typically uses a set of services to provide the desired functionality to a human user. Services are identified primarily based on the interface implemented by the service. Service interfaces are abstract and serve to insulate the service consumer from the service implementation. Services can be further identified based on attributes associated with the service. Attributes may be used to characterize services and to aid in distinguishing services implementing the same interface from one another, such as on the basis of cost, performance, and so forth.

Services can be considered to fall into two broad categories, local services and remote services. Local services provide access to functionality that is local to the platform such as an on-board GPS device. Remote services are offered by an external server, such as a remote communications node, and are accessed via a communications link, such as a wireless link or interface.

Consolidator Service—Hidden Services

A system can have a number of instances of the same service. In order to reduce the complexity of using such services, a consolidation service can be utilized. This service consolidates the underlying services and presents a single, unified service to users. The underlying services can be declared "hidden", so as to obscure their presence from service-requesting entities when performing a service lookup.

These services can be explicitly located by specifying that "hidden" services be included in the search. The service framework 235 provides access to a hidden service only if the service-requesting entity explicitly specifies that "hidden" services should be considered when performing the lookup. When this is done, and access is provided to a hidden service, the existence of the service is disclosed to the service-requesting entity.

Private Services

The exposure of a service on a client platform to external communications nodes is controlled by declaring the service "private" or not. Most services on a mobile client platform, e.g. stock portfolio or personal address book, would be private. However, some services may be visible to an external communications node. For example, a juke box service could be visible to a home entertainment system and/or personal computer when a mobile client platform is parked at home, but it could be invisible when it is away from home. Any service that needs, as part of its normal function, to be accessed by an external communications node, particularly where the access is also initiated by the external communications node, would be non-private.

A service can have any of four possible combinations of "hidden" and "private" attributes, as shown by Table 1 below:

TABLE 1

| Security | | |
|---|---|---|
| "Hidden" | "Private" | Result |
| No | No | Service is visible locally and externally. |
| No | Yes | Service is visible locally but not externally. |
| Yes | No | Service is visible locally and externally only if "hidden" is explicitly specified on lookup |
| Yes | Yes | Service is visible locally only if "hidden" is explicitly specified on lookup; service is not visible externally. |

Security

The above-described "hidden" and "private" attributes determine whether or not a service can be exposed to internal and/or external entities. Additionally, a suitable security check is made prior to providing access to the service by internal and/or external entities. The security check is performed using appropriate access controls, e.g. certificates. Access is granted only to those services and applications having proper authorization.

Representation of Remote Services Through Local Proxy

In order to simplify things for the entity using the service, it is desirable for remote services to appear exactly like local services from the perspective of the user platform. One way to accomplish this is to represent each remote service as a local service through the use of a local proxy. This proxy insulates the service-using entity from the complexities of communicating with the remote server. It also unifies the access methods. The same methods are used to access a remote service as are used to access a local service. This is useful should a remote service become available that is in some way superior to a corresponding local service. An application using the local service could switch to the remote service and use it just like the local service.

Service Components

A major benefit of using services is the flexibility derived from the abstraction of the functionality performed by the service. Every service comprises two basic components: the service interface and the service implementation. The service interface comprises details concerning the methods and variables that the service exposes in order for some service-requesting entity, such as an application or another service, to make use of the service. The service implementation comprises details concerning the implementation of these methods as well as any additional, internal methods. In order to use the service, only the interface need be known. The details of the implementation are hidden and of no interest to the using entity. This allows the implementation to change without impacting the using entity (so long as the interface is preserved).

Service Framework—General

In a distributed wireless information appliance system 100, such as that disclosed herein, a rendezvous mechanism is required to allow services to advertise themselves and to enable potential service-using entities to locate them. The service framework provides such a mechanism. The service framework is a facilitator that provides a standard, simple way for services to make themselves available and for service-using entities to locate the services that they are interested in. It provides an organization or structure for services that results in a unified and consistent view of the services.

For example, the details of obtaining navigation information from a gas station kiosk versus an Internet navigation server via a cellular data link when on the highway will be very different. The application does not have to concern itself with these details. It is primarily interested in getting the navigation information. Implementing this functionality as a separate service rather than incorporating it in the application itself isolates the application from the details of the implementation and also provides flexibility in dealing with facilities that are similar but different. It also provides multiple applications with access to the same functionality in an efficient manner that conserves memory, communications bandwidth, and processing resources.

The service framework provides a way for services to announce their availability. Services register themselves with the service framework. Services de-register themselves when they become unavailable.

The primary way in which a service is identified and selected is based on the type of the service, i.e. the classes and interfaces that comprise the service. Services that are similar in this respect require a way to distinguish themselves from one another. This is accomplished using attribute sets. Each service may optionally specify a group of attribute set objects that further characterizes the service. An example of such an object is a service information object that specifies the service vendor, version identifier, etc. The service framework allows the service to alter these attributes while maintaining its registration.

Attributes provide a potential user with a way to refine service selection beyond just the service type. Different implementations of the same service can be distinguished from one another through the use of attributes. For example, there may be some characteristic of a service (such as cost or performance) that may be valuable to the user when selecting one service over another.

The service framework provides a way to resolve dependencies. Services may be employed by other services and not just by applications. It is possible that a circular dependency loop is formed amongst a group of services. A deadlock may arise if each service registers only after it has successfully located all services upon which it is dependent. Attributes may be used to avoid such a situation. Dependent services proceed to register themselves but include an attribute indicating the service is unavailable. This exposes the service to any other services that may be dependent on it. Once the service has located all services it is dependent on, it may alter the attribute to indicate the service is now available.

The service framework provides a way for a service-using entity, whether an application or another service, to look up a service. The service of interest is described in terms of its type and possibly also attribute set values. On a successful match, the service framework provides the caller with an object containing a reference to the service object. The caller can invoke the service via this object.

The service framework provides a synchronization mechanism to allow services and their service-using entities to come up in any order with respect to one another. Service-using entities may register for asynchronous notification of service events. Such events may be used to inform the client of a service becoming available, becoming unavailable or changing in some way.

Service Framework Architecture

According to one embodiment, the service framework includes a service registry, a local service lookup function, and a remote service lookup function. The local and remote lookup functions also include an asynchronous notification function. Although the architecture is symmetrical, the normal behavior is asymmetrical. In normal operation, the mobile client plays more of a master role with the servers acting like slaves. Also, local services can be designated as "private", making them invisible to entities off the client platform.

The service registries are repositories for local services. Facilities are provided to add services to, remove services from, and alter services within the registry. Support of basic life-cycle management functions is provided. These can be used by services to provide a hot upgrade capability. The old version and the upgrade are gracefully switched after the internal state is transferred, completely transparently to the subscribing services and applications.

From the perspective of a service consumer, local and remote services are located and used in an identical manner. The consumer employs a single lookup facility that consolidates a potentially large number of remote lookup services under it. Remote services are represented by a small local proxy (also referred to herein as the "remote service frontend" or "remote service proxy"). This proxy is installed on the client platform through a secure provisioning mechanism. This obviates the need to dynamically load code in the field. This proxy becomes aware of the availability of the remote service and, after establishing communications with the remote service, it registers itself as the service. Service-using entities on the client platform wishing to make use of the service do so through the proxy and are unaware of the existence of the remote component.

Local proxies representing remote services are provided with additional capabilities not available to normal services or service consumers. These facilities provide access to remote lookup services and allow the proxy to locate its remote counterpart. These lookups are performed just-in-time so as to minimize the caching of remote service information locally. Proxies can request asynchronous notification of a remote service becoming available. Such requests are resolved as a batch when a remote lookup service becomes available to reduce the demands on the communications medium.

Remote services inherit all attributes associated with its lookup service. This supports a hierarchical organization of services that is useful in constraining lookups.

Language independence is achieved by implementing the underlying remote service support using a language independent service location technology. The local proxies are able to locate their remote counterpart in a language independent fashion but still present a local, Java™-based view of the service.

The system imposes a set of mandatory methods to be implemented by all services. These include methods to support life-cycle management functions.

Overall, the service framework architecture supports security, performance, and ease of use.

Since, in one embodiment, the present invention is implemented in a vehicle-based information appliance, such appliance needs to be as reliable as a car radio. In addition, security is of utmost concern. The suppliers of automotive original equipment manufacture (OEM) equipment typically prohibit the downloading of software onto a vehicle-based information appliance. Any software to be installed on the customer platform must first be certified. Even software that has passed certification can only be installed on the platform by an authorized installer. These restrictions preclude the dynamic downloading of service proxies as is done by prior art connection technologies, such as the Jini™ connection technology.

The service framework addresses this through the use of distributed remote services. Every remote service comprises two portions: a frontend portion and a backend portion. The service frontend or local proxy is installed on the client platform. The service backend resides on the server providing the service. The proxy can request asynchronous notification of a remote service becoming available. The service framework only looks for the service backend when the proxy has requested the service. When the service frontend discovers the service backend via the service framework, the two halves effectively coalesce, resulting in a fully formed service that is made available to service-using entities. Service-using entities invoke the service through the service frontend, which communicates with the service backend to carry out the service. No code is downloaded to accomplish this. No effort is made to locate the remote service until a request to do so is made by the service frontend (i.e. the local proxy).

Since all remote services are represented by a local service frontend, loss of communications with the service backend due to a fault or mobility can be detected by the service frontend. The service frontend can respond by de-registering the service. This obviates the need for a leasing mechanism such as is provided by the known Jini™ connection technology and simplifies the job of a service writer.

Also in the interest of security, the service framework supports an asymmetrical view of services. Local services may be tagged as being "private" to prevent their advertisement to external lookup servers.

The service framework also handles remote services in a manner that conserves memory and reduces the load on the wireless communications pipe. Whereas, the Jini™ connection technology suggests that services register themselves with all lookup servers belonging to the same group irrespective of demand for the service, this could overwhelm an information appliance both in terms of memory usage and communications traffic. The service framework does not over-populate its local registry with entries representing all available remote services. Instead, it performs just-in-time lookups by invoking the remote lookup service itself on an as needed basis. Successful lookups return information that is required to communicate with the remote service. This information is propagated to the interested entities by the service framework but is not otherwise cached. Memory utilization is minimized, and the bandwidth is used efficiently, since all of the traffic is demand driven.

In the interest of simplicity, the service framework presents all services, whether local or remote, as local services to the application. The service framework provides a single consolidated lookup service that can be used by applications to locate any service. Any remote lookup services that become available are handled internally by the service framework and are not exposed to applications.

Remote service frontends, however, are aware of the local/remote distinction and are provided with a special interface into the service framework to support the discovery of the remote service backends. This interface is hidden from applications.

The service framework requires that all services implement a basic interface. This interface declares a number of mandatory methods that support functions such as life-cycle management.

Services may invoke other services. If a service is implemented to act solely as an aid to other services, it may be tagged as being "hidden". The presence of such "hidden" services is obscured from applications. They are located only by explicitly specifying that "hidden" services be included in the lookup.

Remote Service Lookup

Figure 7:
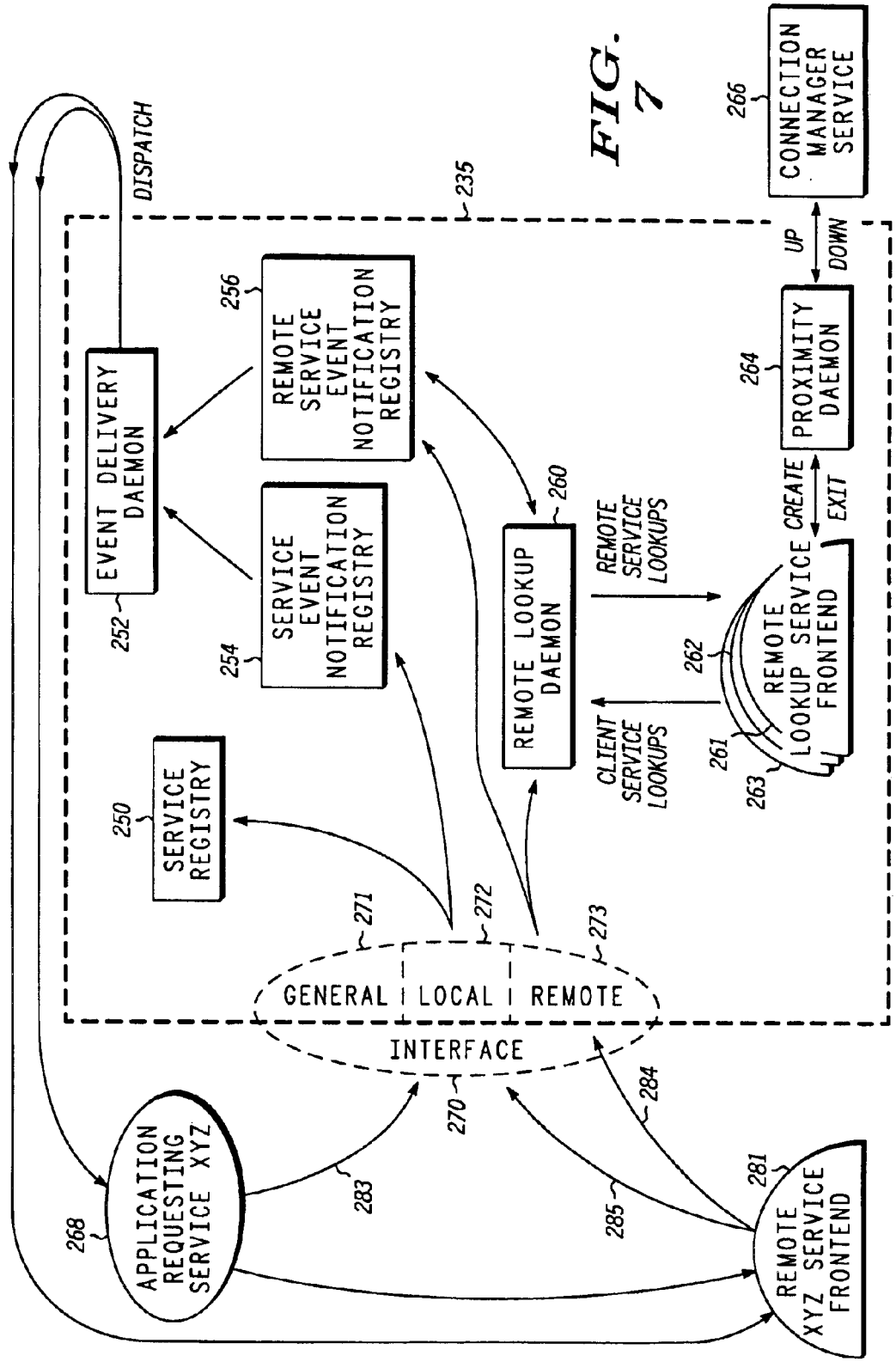
FIG. 7 illustrates a simplified block diagram showing various components of a service framework, according to one embodiment of the invention.

FIG. 7 illustrates a simplified block diagram showing various components of a service framework 235, in accordance with one embodiment of the invention. The service framework comprises a service registry 250, an event delivery daemon 252, a service event notification registry 254, a remote service event notification registry 256, a remote lookup daemon 260, one or more remote lookup service frontends 261–263, a proximity daemon 264, and a service framework interface 270 that includes local portion 272 and a remote portion 273. Service registry 250 contains entries representing both local services as well as remote or distributed services. Service registry 250 is a data object that functions as a repository of service entries. Using service registry 250, applications can perform a lookup for a desired service, specifying the type of service (using one or more Java™ classes defining the service interface of interest, e.g. position devices, network access devices, etc.), and optionally attributes.

As mentioned above, services typically comprise two parts: an interface to the service and an implementation of the service. These are packaged as two distinct things. The implementation of the service can be changed without affecting the interface.

The service event notification registry 254 is a data object within the service framework in which notification requests are stored. Notification requests can originate from services as well as applications. Notification requests include the type of service (using one or more Java™ classes defining the service interface of interest, e.g. position devices, network access devices, etc.), a reference to the entity (e.g. application or service) that issued this service request, the service events of interest (e.g. match, no match, change), and optionally attributes. If an application says "tell me when a service XYZ becomes available", a notification request is stored in service event notification registry 254. This applies to both local and distributed (remote) services. When a local service (not shown) or a service frontend 281 registers, unregisters, or alters its attributes with the service framework 235, the service framework 235 will look at the service event notification registry 254 to determine whether a notification request for this service has been registered as requested by a service-requesting entity, such as application 268. If there's a match, the event delivery daemon 252 is invoked to dispatch the event to the entity, such as application 268, interested in that service.

Remote service event notification registry 256 is analogous to service event notification registry 254, but it only deals with the backend of a distributed service. When a service frontend 281 (also referred to herein as a "local proxy" or "remote service proxy" and discussed in greater detail below in the section entitled "Remote Service Discovery and Connection") puts in a request for a remote service, that request is stored in remote service event notification registry 256. Remote service event notification registry 256 contains similar information to the service event notification registry 254, but remote service event notification registry 256 only contains information relating to remote service backends.

Proximity daemon 264 is interested in communications links being completed or terminated. The connection manager service 266 comprises a proximity-detecting program module that sends a notification of a communications interface coming up or going down to the proximity daemon 264. When an interface comes up, the proximity daemon 264 creates an instance of the remote lookup service frontend, such as remote lookup service frontend 261, 262, or 263 and informs it of the connection details.

Assuming in this case that remote lookup service frontend 261 has been created, it tries to communicate with its corresponding remote lookup service backend. The remote lookup service frontend searches for a remote lookup service backend by broadcasting or multicasting for a response from a listening remote lookup service backend.

If it locates its remote lookup service backend, and if the remote lookup service frontend determines that it is compatible with the remote lookup service backend, the remote lookup service frontend notifies the remote lookup daemon 260. There is one remote lookup daemon 260, and it can handle multiple remote lookup service frontends such as remote lookup service frontends 261–263.

Remote lookup daemon 260 performs a lookup on any notification requests pending in the remote service event notification registry 256, batching them within the remote lookup daemon 260, and it sends them to the remote lookup service frontends 261–263 that found a compatible remote lookup service backend. The remote lookup service frontends 261–263 pass the information across the interface to the remote lookup service backend, which looks for a service backend in a backend service registry on the remote communications node. The remote lookup service backend replies with each of the requests, whether it found a suitable match or not. For matches, the remote lookup service backend also obtains the parameters necessary for the service frontend to communicate with the service backend.

The responses, including the parameters for any matches, are delivered to the remote lookup daemon 260 via the remote lookup service frontend. If a match is found, the remote lookup daemon 260 tells the remote service event notification registry 256 to dispatch the match (i.e. which entry matched) to the event delivery daemon 252, and from there a dispatch is sent to a service frontend, such as service frontend 281.

The listener extracts the parameters and establishes a connection to the remote service backend. The remote service frontend and remote service backend communicate to determine whether they are compatible. If so, the remote service frontend registers the combined service (i.e. remote service frontend and remote service backend) as a remote service with the service registry 250 of service framework 235. This registration is for the distributed or remote service.

The service framework 235 checks the service event notification registry 254 to see if there are any pending requests for this particular service, and if it finds one, an event is dispatched by the event delivery daemon 252 to the requestor, such as application 268, informing it of the availability of the service. The application 268 can then invoke the service, whereupon the remote service frontend communicates with the remote service backend to implement the service.

Service Location—Setup

The operation of one embodiment of service framework 235 will now be explained in terms of how a service-requesting entity, such as application 268 requests and locates a remote service. In this scenario, an application 268 attempts to locate a point of interest (POI) service, which is assumed to be a remote service. The order in which the actions are presented is not critical.

Before a service or application can use the service framework 235, it must obtain a reference to the service framework 235. This is done through a static method. This method provides an object that implements the external interface 270 to the service framework. This interface is used to perform service lookups, register, unregister, and alter services, and to register and cancel service notification requests.

The application 268 constructs a template describing the service it is interested in, e.g. the POI service. This template comprises an array of classes and interfaces to implement the service, plus an optional array of attribute sets that further describe the service. The template is passed via arc 283 to external interface 270 and into the service framework 235 which internally examines the service registry 250 for a matching service. In the current example, after the service registry 250 is examined, it returns a null indicating a service matching the template was not found.

Upon learning that the service was not found, the application registers a request to be notified of the service's availability. The same template is passed via arc 283 and external interface 270 into the service framework 235, this time requesting notification. In addition, a service event listener and a transition mask are supplied within the service framework 235. The listener specifies the method to be invoked when the event occurs. The transition mask controls the match semantics and, in this case, is set to generate an event when a match is made. The service framework 235 caches this request in its service event notification registry 254, and a registration object is returned to the application 268. This object can be used subsequently to cancel the request.

The individual remote service frontends go through a similar sequence attempting to locate their respective remote service backends. These services use a different service framework interface from the one used by the application. They use the portion of the service framework interface supporting remote services 273. Each remote service frontend performs a lookup via arc 284 through interface 270 to remote lookup daemon 260, which looks for a corresponding remote service backend. Since, assuming for the current example, there are no remote lookup services in proximity at this time, all of these lookups fail and return null.

As was done by the application, the remote service frontends then register requests to be notified of the remote service backends' availability. The manner in which this is done can be identical to that followed by the service-requesting entity in registering a notification request in the service event notification registry 254. However, in this case it results in a request via arc 284 through interface 270 to the service framework 235, which caches the request in its remote service event notification registry 256.

Service Location—Completion

At some point in time, the client platform 200 (FIG. 5) of user device 108 (FIG. 1) comes in proximity of a place containing remote services, such as a local node 106, and a short-range wireless communications connection or link is established between the local node 106 and the client platform 200. This causes the proximity daemon 264 of the service framework 235 to be notified. The proximity daemon 264 is an internal component of the service framework 235 that is created during startup. It requests to be notified of the establishment of a connection on any platform communications interface. This request is serviced by a component external to the service framework 235, i.e., the connection manager service 266.

When the proximity daemon 264 receives notification of a new connection, it instantiates a remote lookup service frontend, such as one of remote lookup service frontends 261–263, and passes it the particulars of the connection. This remote lookup service frontend 261–263 differs from other remote service frontends in that it does not use the service framework 235 to locate its remote lookup service backend. Rather it sends out either a multicast or broadcast soliciting a response from a listening remote lookup service backend. If there is no response, retries are sent at periodic intervals. These continue until the remote lookup service frontend is instructed by the proximity daemon 264 to exit, e.g., if the platform moves out of range of the local node 106.

If, however, a response is received, the remote lookup service frontend and remote lookup service backend exchange parameters and verify that they are compatible with one another. If so, the distributed remote lookup service frontend 261–263 is fully formed and is registered via arc 285 through interface 270 with the remote lookup daemon 260.

The remote lookup daemon 260 is another internal component of the service framework 235. It is responsible for dispatching remote lookup requests to whatever remote lookup services happen to be available.

On receipt of the remote lookup service registration, the remote lookup daemon 260 sets out to see if it can resolve any of the pending notification requests for remote services. The remote lookup daemon 260 accesses the remote service event notification registry 256 containing these requests. The remote lookup daemon 260 delivers these to the remote lookup service frontend 261–263. The remote lookup service frontend 261–263 asks a remote lookup service backend on the remote server to perform the actual lookup by looking for the remote service backend on the remote server, e.g. in a backend service registry on the remote server.

For each lookup request received by the remote lookup service backend, it determines whether the specified service exists in its registry of service backends. If it does, the parameters required to establish communication between the remote service frontend and remote service backend are returned to the requestor. In the current example, the point of interest (POI) service backend is found, and the parameters pertinent to this service are returned to the remote lookup daemon 260 via the remote lookup service frontend.

On receipt of the successful lookup response, including transfer of parameters, the remote lookup daemon 260 generates an event to notify the POI service frontend of the existence of its remote counterpart. This event carries the parameters that the POI service frontend will need to communicate with the POI service backend.

The listener (within the remote service event notification registry 256), that the POI service frontend specified when it registered the notification request, is invoked and is passed the event. The listener extracts communication parameters from the event and uses these to establish a connection to the POI service backend. If the POI service backend is determined to be compatible with the POI service frontend, the POI service is fully formed. The POI service frontend registers the POI service via arc 285 with the service registry 250 of service framework 235. This results in the POI service being added to the service registry 250.

On this registration, the service framework 235 examines its service event notification registry 254 for notification requests that are satisfied by this registration. The listener associated with the application waiting for the POI service is invoked and sent an event announcing the availability of the service. This event provides the application with a reference to an object implementing the POI service interface, namely the POI service frontend.

The application then invokes the POI service methods, and the POI service frontend communicates with the POI service backend to carry out the requests.

Remote Service Discovery and Connection

The service framework provides a mechanism by which remote services can be discovered and connected. Remote services can register with the service framework through a remote service frontend 281 (FIG. 7), also referred to herein as a "local proxy" or a "remote service proxy". Remote services are also unregistered by the remote service frontend 281, when their remote service backends become unavailable. Thus, the service framework provides a way for client-platform based service-using entities, whether an application or another service, to discover and connect to a service, whether it is a local service or a remote service.

More specifically, when a service is requested from a remote server, a remote lookup service entity on the client platform, known as a remote lookup service frontend, attempts to find its counterpart on the remote server, known as a remote lookup service backend. If a remote lookup service backend exists, this service becomes available to the service framework and can be employed to perform lookups for remote service backends.

If the remote lookup service backend finds a requested service in its server-based registry of remote service backends, it returns the parameters to the client-side remote service frontend that are needed to establish communications with the server-based remote service backend.

If the remote service frontend determines that it is compatible with the remote service backend, the remote service frontend registers itself as a remote service with the service framework on the client side.

This will be explained in further detail regarding FIGS. 9 and 10 below. However, first a local service-locating operation will be discussed with reference to FIG. 8.

Figure 8:
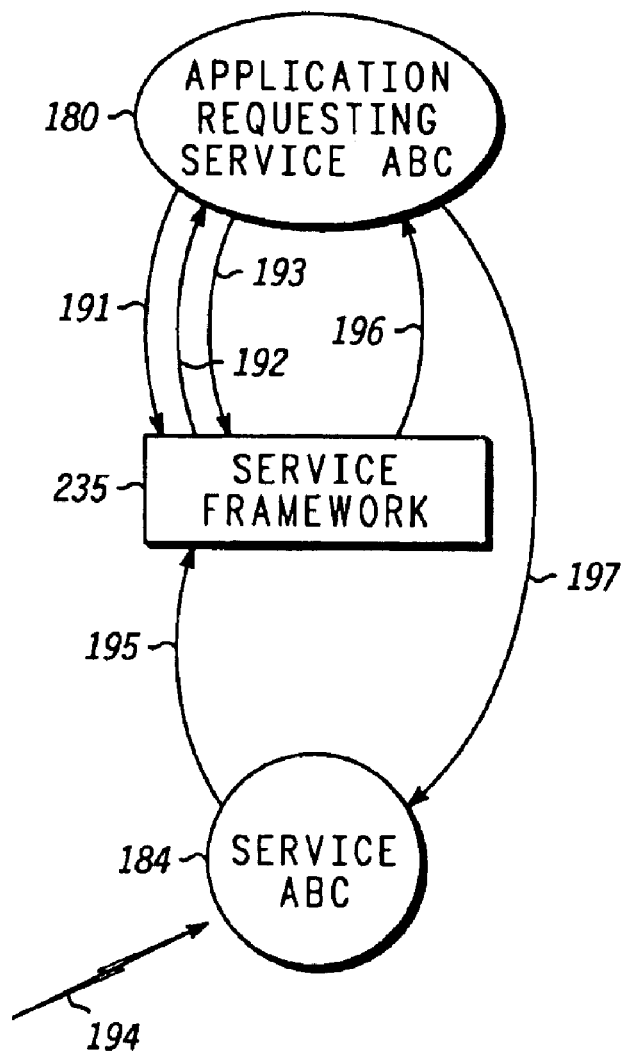
FIG. 8 illustrates a diagram depicting a local service lookup operation, as performed by a service framework, according to one embodiment of the invention.

FIG. 8 is a diagram depicting a local service lookup operation as performed by service framework 235, according to one embodiment of the invention.

In FIG. 8 three entities are depicted: an application 180, a service ABC 184 that application 180 is interested in and is requesting, and service framework 235. In this case service ABC happens to be a local service, i.e. one that is resident on the client communications platform.

In arc 191, application 180 puts together an object describing the service ABC that application 180 is interested in, and it passes that object into service framework 235 to have service framework 235 perform a lookup.

In arc 192, service framework 235 responds to application 180 either that it found service ABC or it didn't find it. However, for the purposes of this illustration, it is assumed that service framework 235 hasn't yet found service ABC.

In arc 193, application 180 sends a notification request to service framework 235 to notify application 180 when service ABC comes into existence.

In arc 194, after the passage of some time, it is assumed that service ABC is instantiated.

In arc 195, service ABC is registered with service framework 235. As part of that registration, service framework 235 determines that this service ABC satisfies the service request from application 180.

In arc 196, service framework 235 notifies application 180 about service ABC. The notification comprises all of the information that application 180 needs in order to utilize the service.

In arc 197, application 180 invokes service ABC.

Figure 9:
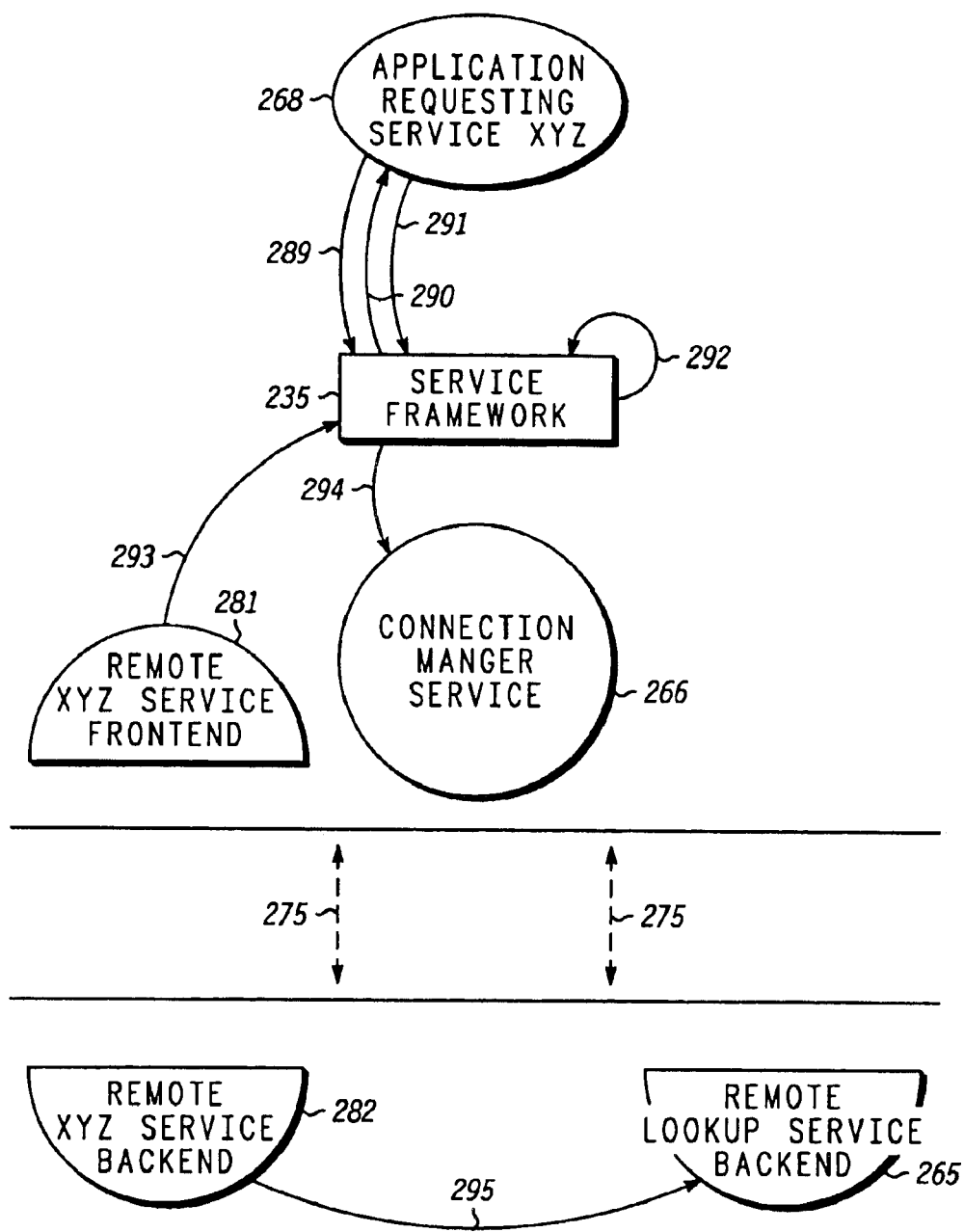
FIG. 9 illustrates a diagram depicting the initiation of a remote service discovery operation, as performed by a service framework, according to one embodiment of the invention.

FIG. 9 is a diagram depicting the initiation of a remote service discovery operation as performed by the service framework 235, in accordance with one embodiment of the invention. The service framework 235 extends the service-locating function described in FIG. 8 to remote services, and it handles service location and connection in a way that has several advantages, particularly for mobile platforms.

In FIG. 9, the portion above dashed arrows 275 contains entities located on the client platform, and the portion below dashed double-headed arrows 275 contains entities located on a remote server. The dashed double-headed arrows 275 extending between the client and server portions represent the fact that the client and server are not currently in proximity to each other.

In FIG. 9, operations represented by arcs 289–295 can be performed in various orders, and they are not necessarily limited to any sequence that is related to the choice of reference numbers.

In arc 289, application 268 puts together an object describing the service XYZ that application 268 is interested in, and it passes that object into service framework 235 to have service framework 235 perform a lookup.

In arc 290, service framework 235 responds to application 268 either that it found service XYZ or it didn't find it. However, for the purposes of this illustration, it is assumed that service framework 235 hasn't yet found service XYZ.

In arc 291, application 268 sends a notification request to service framework 235 to notify application 268 when service XYZ comes into existence.

In arc 292, service framework 234 performs an implicit request for notification of a remote lookup service.

In arc 293, the remote service frontend XYZ 281 requests notification of the remote service backend.

In arc 294, the service framework 235 requests notification of any interface state changes observed by the connection manager service 266.

Meanwhile, on the remote server, in arc 295 the remote service XYZ backend 282 registers itself with the remote lookup service backend 265. This registration can be made, for example, into a backend service registry on the remote server.

Figure 10:
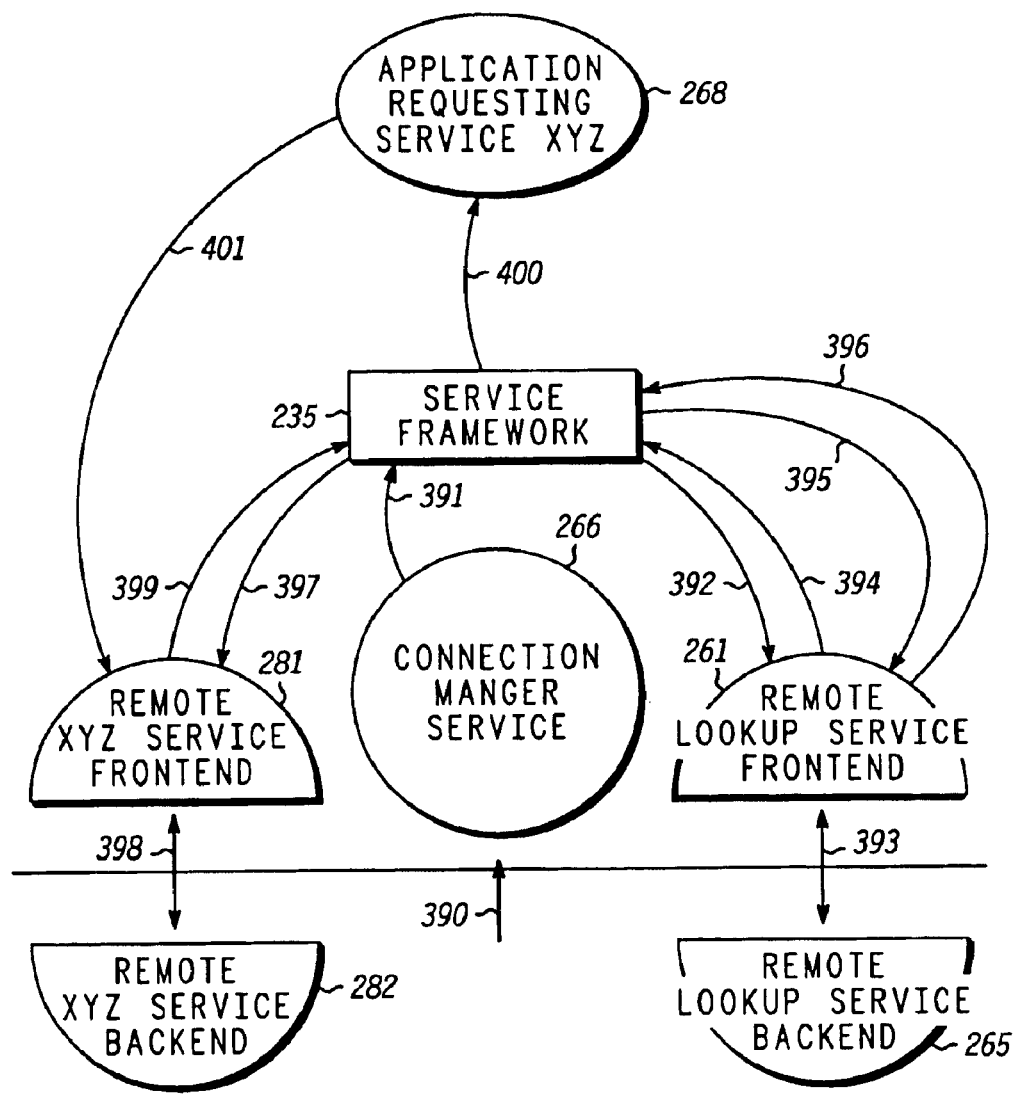
FIG. 10 illustrates a diagram depicting the conclusion of a remote service discovery operation, as performed by a service framework, according to one embodiment of the invention.

FIG. 10 is a diagram depicting the conclusion of a remote service discovery operation as performed by the service framework 235, in accordance with one embodiment of the invention.

As represented by arrow 390, the client platform comes into proximity to the remote server.

In arc 391, the connection manager service 266 becomes aware of the proximity of the client platform to the remote server, and it notifies the service framework 235 of the change of state to "connected".

In arc 392, the service framework 235 instantiates an instance of the remote lookup service frontend 261.

As represented by double-headed arrow 393, the remote lookup service frontend 261 attempts to communicate with its counterpart (remote lookup service backend 265).

Assuming the interchange of parameters is successful, in arc 394 the remote lookup service frontend 261 registers itself with the service framework 235. This registration represents the remote lookup service frontend and service backend as one unit.

In arc 395, as part of the registration, the service framework 235 invokes this new remote lookup service backend 265 to search for any pending remote services, in this example, the remote service XYZ backend 282 of the desired service XYZ. In this example, it is assumed that remote service XYZ backend 282 is found, and that the parameters necessary for remote service XYZ frontend 281 to communicate with remote service XYZ backend 282 are obtained by remote lookup service frontend 261.

In arc 396, also as a part of the registration, the remote lookup service frontend 261 returns (to the service framework 235) the parameters needed by the remote service XYZ frontend 281, so that remote service XYZ frontend 281 can talk to remote service XYZ backend 282.

In arc 397, the service framework 235 proceeds to notify the remote service XYZ frontend 281 that the remote service XYZ backend 282 has been found. The parameters are passed along with this notification.

As represented by double-headed arrow 398, the remote service XYZ frontend 281 communicates with the remote service XYZ backend 282 over a bidirectional wireless link using the parameters. The parameters can include the address of remote service XYZ backend 282 (e.g. Internet address and port number), version information (if incompatible, the service discovery operation could be terminated), possibly attributes (e.g. if a printer, the capabilities—color, resolution, speed, etc), and so forth.

In arc 399, assuming the communication was successful, the remote service XYZ frontend 281 registers the combination service (i.e. remote service XYZ frontend 281 plus remote service XYZ backend 282) with the service framework 235. As part of that registration, the service framework 235 determines that there is an application 268 that has a request pending for this particular service XYZ.

In arc 400, the service framework 235 notifies the application 268 about service XYZ. That notification provides the application 268 with all of the information it needs to make use of the service XYZ.

In arc 401, the application 268 invokes the service XYZ. The remote service XYZ frontend 281 communicates with remote service XYZ backend 282 to perform the requested service XYZ.

From the foregoing description of remote service discovery and connection, it will be seen that application 268 is minimally involved in discovering and connecting with remote service XYZ. In arc 291 (FIG. 9), it requested notification from service framework 235 of service XYZ; in arc 400 it was informed of service XYZ; and in arc 401 it invoked service XYZ.

In FIG. 10, the service XYZ represented by the combination of remote service XYZ frontend 281 plus remote service XYZ backend 282 can be viewed as a distributed service that has both a local and a remote component. The local component acts as a proxy for the remote component. The service represented by connection manager service 266 is viewed as a local service.

In FIGS. 8–10, the operations represented by the arcs are not necessarily ordered in any particular way, and they could be performed in a different sequence from that shown.

Service Framework APIs

The following is a high level description of the service framework APIs and their constituent classes and interfaces.

The service framework envisions an environment of applications and services. In this context, an application is a UI-based presentation of a service or a set of services to a human user. A service is a reusable application component. It may originate as part of an application but migrate to a service if multiple applications have a common need it satisfies.

The service framework API set provides several functions. First, it provides services with a means by which they can advertise themselves to potential service-using entities (applications and other services). This is done through a registration process.

Secondly, it provides applications and services with a mechanism to search for available services. It also allows applications and services to request notification should a service meeting certain specified criteria become available in the future.

Thirdly, it provides a uniform mechanism for accessing both remote and local services.

The service framework APIs apply to the interface between applications/services and the service framework to register and discover local and remote services. The remote services that are supported require a local proxy or service frontend.

The APIs provide application and service developers with a simple yet powerful set of APIs to advertise and locate services.

The following examples typify several scenarios that are implemented by the APIs.

Use Case #1—Resident Address Book:

The information appliance is configured with an address book application that provides the user with an interface to the various address books that may be present on the client. In addition to the permanent resident address book, transitory address books may be created and populated from accommodated devices such as PDAs, wireless phones, personal computers, etc. The application can present the contents of these address books to the user as individual address books or as a single merged virtual address book.

During system startup, the service representing the resident address book is registered. Although this service is created very early in the startup sequence, it is able to locate the service registry 250 (FIG. 7) and successfully register itself with it.

The address book application starts up and issues a query to the service registry to determine what address book services are currently available. It is informed of a single service—the resident address book. Upon examination of the service's attributes, the application determines the service is permanent so notification of status changes is not required. The application then obtains a reference to the service in order to access its entries. This interface is used to inform the application of any additions or deletions.

Use Case #2—Accommodated Device Address Book

In order to incorporate any address books that may become available from accommodated devices, the address book application registers a notification request with the service framework 235 which adds the request to the service event notification registry 254. This request states that the address book application be notified of any address book service registrations.

The driver powers up his PDA and begins transferring the addresses of the various sales calls he needs to make that day into the information appliance via a wireless link. The first address is received by the object exchange protocol module associated with the wireless interface being used and is recognized to be an address book object. The module learns from the discovery module in the protocol stack that the device is named "Jack's PDA". Since this device is registered in the information appliance's configuration, user authentication is not required. The registry is queried to see whether an address book service with a name attribute equal to "Jack's PDA" already exists. It does not, so the object exchange module creates the service with the single entry received so far and registers it. This service also has an attribute indicating it is a transient service.

The address book application receives notification about the new address book. It obtains a reference to the service and incorporates its address book entries for presentation to the user. Although the implementation of this service differs from the resident address book (Use Case #1), the application interaction with it is identical due to the use of a standardized interface.

The application examines the service attributes and uses the name "Jack's PDA" in the user interface. It also notices the transient attribute. This causes the application to request notification of when the service is no longer available.

The information appliance is configured to expire address books associated with accommodated devices after some period of time. When this time has elapsed, the "Jack's PDA" address book service is unregistered. The address book application is
  notified of this and removes entries that it had tagged as belonging to the now departed address book from its internal representation and updates the user interface accordingly. Since the application had registered a blanket request to be notified of any address book becoming unavailable, it now cancels the request.

Use Case #3—Authenticated Address Book

The passenger powers up her PDA to provide some additional addresses. The PDA is detected by the information appliance. Unlike the driver's PDA, this one is not registered in the information appliance configuration and requires user authentication. The address book service created to represent this device performs the authentication. Only if the authentication was successful does it register the service and allow the transfers to proceed. It is the service itself and not the service framework that is responsible for the authentication.

Use Case #4—Address Book Restricted by Security Policy

The passenger has a huge address book on her PDA and inadvertently initiates a transfer of its entire contents.

Addresses proceed to be transferred into the information appliance until the service's storage quota is reached. Attempts by the service to store additional addresses fail. This quota is enforced by the entity responsible for the runtime management of applications and services.

Use Case #5—Remote Service Provided by a Local Node

The driver receives a lengthy email while on the road. Since it is getting close to lunch, the driver configures the information appliance to look for a restaurant of a specific fast food chain that has a print service. He would like to read the email hardcopy while eating. As he comes within range of a restaurant belonging to the desired chain, a lookup is performed and indicates both criteria are met. He pulls in, has his email printed, and has lunch.

Use Case #6—Client Service Advertisement

Two families are driving to an amusement park together in two separate cars. Each car has an information appliance with a "walkie-talkie" service and an application that supports voice communication. Since the cars are traveling close together, the information appliances are able to communicate via a wireless interface. Both devices were configured in terms of security rights prior to departure. Suddenly, an emergency rest stop situation arises in one car. The driver invokes the "walkie-talkie" application to let the other car know they need to pull over. To do this, a service in one client device discovers and makes use of a service in another client device. Another car equipped with an information appliance passes them. As it passes, it joins the wireless network formed by the two original cars. The passing car attempts to perform lookups on the two other cars but doesn't find anything. Services are not advertised to it.

Use Case #7—Consolidated Address Book

The information appliance is configured to present a consolidated address book to the user. In this configuration, an address book service that aggregates various address books registers itself with the service framework 235. It also registers a notification request with the service framework to be notified when a hidden address book service registers. The resident address book service and address books associated with accommodated devices register with the service framework as hidden address book services. The consolidating address book service is informed of these services and proceeds to incorporate their entries into the consolidated address book. When the address book application performs a lookup via the service framework for address book services, it is informed about one address book service: the consolidator. It is not informed about the two hidden services.

Service Framework Characteristics

The service framework 235 provides the following functions that satisfy the above scenarios or "use cases".

The service framework allows a service to register itself.

The service framework allows a service to unregister itself when it becomes unavailable.

The service framework allows applications/services to search for a currently registered service.

The service framework allows applications/services to request notification of future service registrations.

The service framework allows applications/services to request notification of service attribute changes and registration state changes.

The service framework allows applications/services to cancel a notification request.

The service framework supports service attributes that allow a service search to be refined.

The service framework supports examination of service attributes.

The service framework is available and locatable by all applications/services.

Services are restricted to the same stringent security policies imposed by the application manager module 232.

User authentication and authorization need not be requirements of the service framework.

Services are derived from published interfaces when available in order to de-couple the dependency on specific service implementation.

Services and service stubs are resident on the client platform, and they are typically not downloaded.

The service framework detects terminated communications links, and it unregisters services that were solely provided over such communications links.

The service framework is capable of dynamically discovering services external to the client device and using these services via a pre-loaded local proxy.

The service framework is capable of selectively advertising its services to external clients.

The service framework provides a way to disable advertisement of its services to external clients by designating a service as "private" or not.

Remote services inherit the attributes of their lookup service.

The service framework provides a way to obscure or hide services from local clients by designating a service as "hidden" or not.

The following optional functions of service framework 235 deal with dynamically loading code onto the client in an alternative embodiment of the invention.

The service framework could dynamically discover and download services that are external to the client device, e.g. on external communications nodes.

The service framework could provide a suitable mechanism to enable or disable the function of dynamic discovery and downloading of services from external communications nodes.

Class/Interface Usage Overview

The service framework 235 comprises two main components: a ServiceFramework class and an object implementing the ServiceRegistrar interface. The ServiceFramework class defines static methods used by the ServiceRegistrar implementation object to make itself known and by service-using entities to obtain this reference. The ServiceRegistrar object provides service registration and lookup facilities.

In order to use the service framework, a service or application obtains a reference to the ServiceRegistrar object. This is done via the static method ServiceFramework.getRegistrar( ). A reference to the object is returned to the caller.

To register a service with the service framework, the service constructs a ServiceItem object and then passes it to the ServiceRegistrar object via the ServiceRegistrar.register( ) method. The ServiceItem object is composed of a ServiceID (null on initial registration), an Object implementing the interface to the service and an array of Service- AttributeSet objects that specify the service attributes. The service is returned a ServiceRegistration object which it can use to manipulate its attributes (add, delete and modify) and also unregister the service. Services are required to unregister themselves with the service framework prior to going "out of service".

Services are discovered by constructing a ServiceTemplate object and passing it to the ServiceRegistrar.lookup( ) method. This object specifies the service type and characteristics that are of interest. It comprises a ServiceID, an array of Class objects, and an array of ServiceAttributeSet objects. If a component is to be wildcarded, a null may be supplied. The caller is returned an array of ServiceItem objects that match the supplied ServiceTemplate.

Notification of service availability may also be requested. A ServiceTemplate object is passed to the Registrar.notify( ) method along with a reference to the caller's ServiceEventListener object. A ServiceEventRegistration object is returned to the caller. This object can be used to cancel the notification request. When services meeting the criteria specified in the template become available, the notify( ) method in the supplied ServiceEventListener object is invoked and passed a ServiceEvent object.

The preceding description was presented in terms of local services. From the perspective of an entity requesting a service, remote services are located and accessed in exactly the same way. This is accomplished by employing a local proxy for the actual remote service. Remote services can be considered to comprise two components: a client-side or frontend portion (the proxy), and the server-side or backend portion (the remote service). Each proxy is responsible for discovering and linking up with its service backend. Once this is done, the proxy registers itself with the service framework.

The service is made available to service-using entities and has the appearance of a local service. The fact that the proxy needs to communicate with its service backend to carry out service functions is hidden from the service-using entity. When the service frontend loses contact with the service backend, e.g. the communications link terminates, it unregisters itself from the service framework.

Remote service backends are discovered by constructing a ServiceTemplate object and passing it to the ServiceRegistrar.remoteLookup( ) method. This object specifies the service type and characteristics of the remote service backend that are of interest. It comprises a null ServiceID, an array of Class objects, and an array of ServiceAttributeSet objects. The service framework performs the lookup using any available remote lookup services and returns either a RemoteServiceItem object or a null.

Notification of remote service backend availability may also be requested. A ServiceTemplate object is passed to the Registrar.remoteNotify( ) method along with a reference to the caller's ServiceEventListener object. A ServiceEventRegistration object is returned to the caller. This object can be used at a later time to cancel the notification request.

When services meeting the criteria specified in the template become available, the notify( ) method in the supplied RemoteServiceEventListener object is invoked and passed a RemoteServiceEvent object.

Class/Interface Descriptions

The following are class/interface descriptions applicable to the service framework as implemented in one embodiment:

Service—an interface that is implemented by service objects.

HiddenService—an extension of the Service interface that is implemented by services to be obscured from normal lookups.

PrivateService—an extension of the Service interface that is implemented by services not wishing to be advertised externally.

ServiceAttributeSet—an interface used to represent arbitrary service attributes. This is a marker interface used to group a number of typed object references.

ServiceEvent—a class indicating the occurrence of an event within the service framework. It provides a reference to the ServiceItem associated with the event. The class also provides information to help identify the event source. This supports event notification by the services themselves. The class also has a reference to a "handback" object that may have been specified during registration. This can help to demultiplex events within the listener.

RemoteServiceEvent—this class is very similar to the ServiceEvent class with the exception that it provides access to a RemoteServiceItem rather than a ServiceItem.

ServiceEventListener—an interface to an object to be notified of the occurrence of an event within the service framework. This object is registered with the service framework. When an event meeting criteria specified during registration occurs, a ServiceEvent is passed to the object via its notify( ) method.

ServiceEventRegistration—a class returned when notification of service availability is requested. It contains a reference to the event source and the identifier of the event for which notification was requested.

ServiceFramework—a class used to obtain a reference to an object implementing the ServiceRegistrar interface. It comprises the static method getServiceRegistrar( ).

ServiceID—services are assigned an instance of this class during registration by the service framework. It is a unique identifier representing a particular ServiceItem instance.

ServiceItem—services are registered with the service framework using instances of the ServiceItem class. It contains a ServiceID, a Service object implementing the interface to the service, and an optional array of ServiceAttributeSets specifying the service attributes.

RemoteServiceItem—A remote service backend is represented by an instance of this class. It contains the parameters needed by the service frontend to establish communications with the service backend.

ServiceRegistrar—an interface to the service framework. The object implementing this interface forms an important component of the service framework. It contains methods to register a ServiceItem and to look up ServiceItems that meet a specified set of criteria contained in a ServiceTemplate. There is also a method to request notification of events such as the registration of a service or a change in a service. This method is supplied with a ServiceTemplate, a ServiceEventListener, and an optional "handback" object to be passed to the listener in the ServiceEvent.

ServiceRegistration—an interface returned in response to a service registration. It contains the ServiceID that was assigned to the service. It contains methods to modify the service's attributes as well as a method to unregister the service.

ServiceTemplate—a class that specifies the match criteria pertaining to a service lookup. It comprises a ServiceID, an array of class types, and an array of ServiceAttributeSets.

ServiceException—the class represents an exception that occurred within the service framework.

ServiceUnregisteredException—a service method was invoked after the service has unregistered.

UnknownServiceEventException—a listener received an event that it didn't recognize.

ServiceName—a ServiceAttributeSet representing the service name.

ServiceStatus—a ServiceAttributeSet representing the service status (i.e. availability).

The particular APIs, Class/Interface Descriptions, functions, and operations relating to the computer programs described herein are merely illustrative of one or more embodiments of the invention, and other implementations will be apparent to those of ordinary skill in the art.

Methods of Operation

Figure 11:
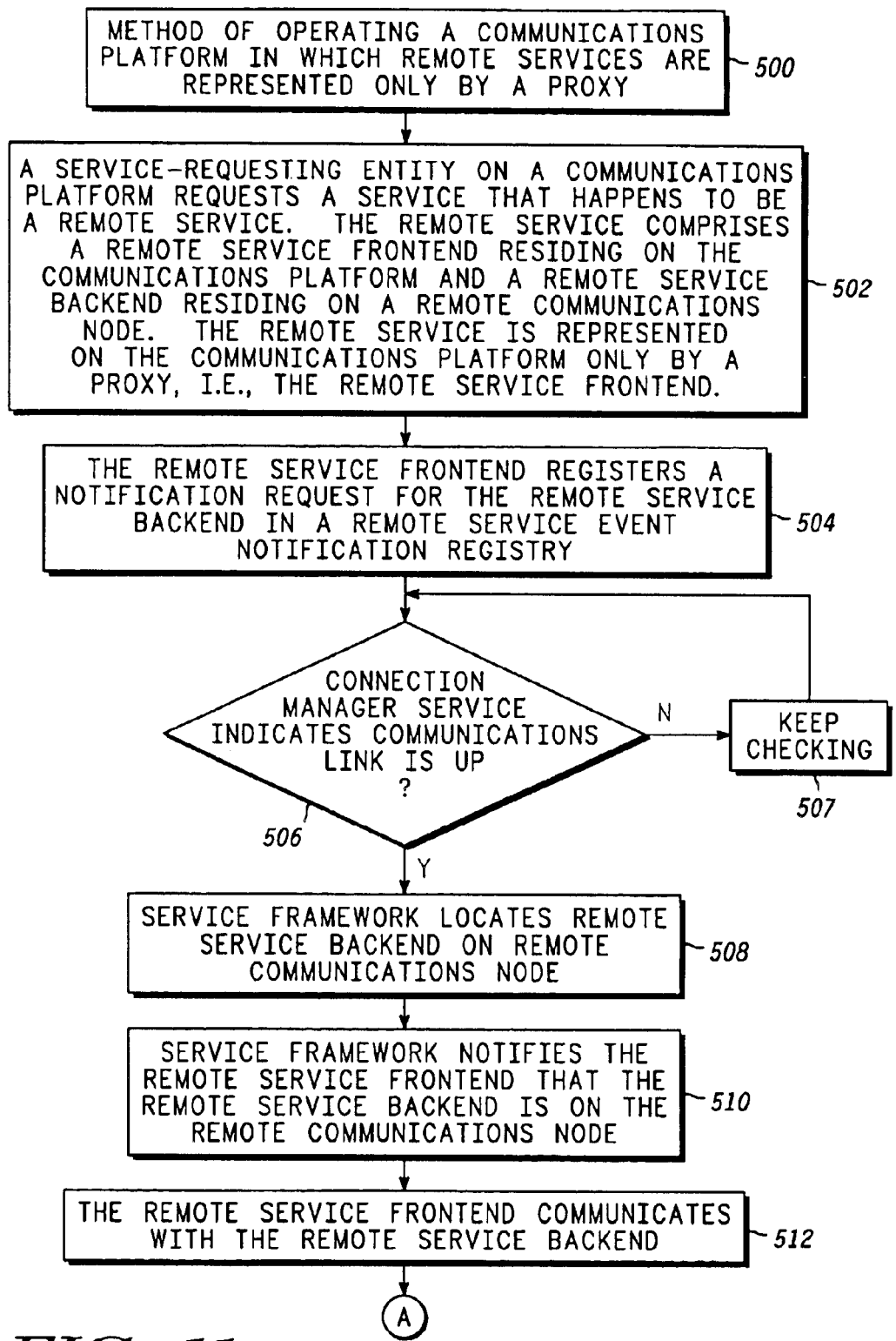
FIGS. 11 and 12 together illustrate a flow diagram of a method of operating a communications platform in which remote services are represented only by a proxy, according to one embodiment of the invention.
Figure 12:
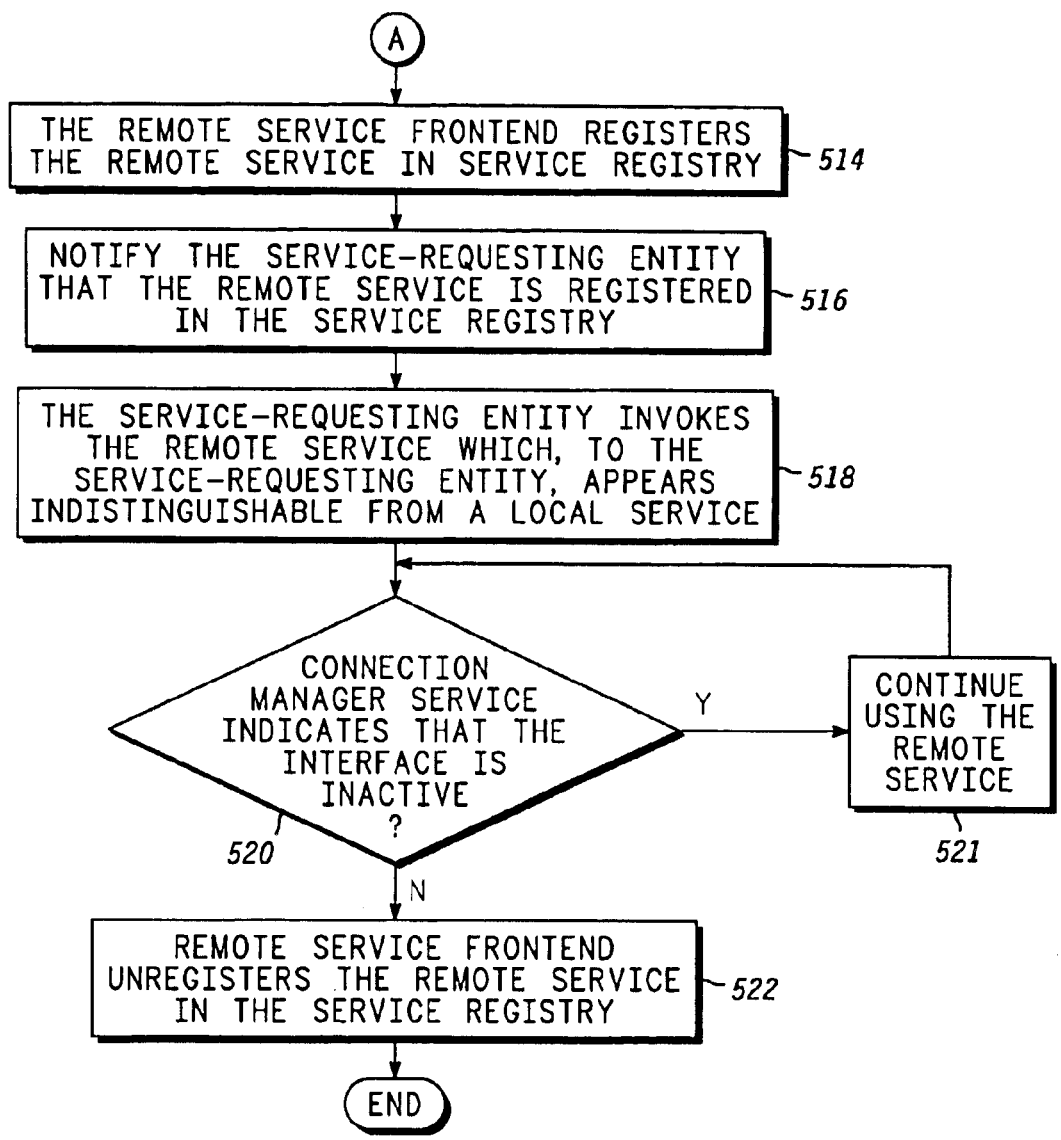

FIGS. 11 and 12 together illustrate a flow diagram of a method of operating a communications platform in which remote services are represented only by a proxy, according to one embodiment of the invention.

In 502, a service-requesting entity (e.g. an application or another service) on a communications platform 200 (FIG. 5) requests a service that happens to be a remote service. The remote service comprises a remote service frontend residing on the communications platform and a remote service backend residing on a remote communications node 300 (FIG. 6). The remote service is represented on the communications platform only by a proxy, i.e., the remote service frontend.

In 504, the remote service frontend registers a notification request for the remote service backend in a remote service event notification registry 256 (FIG. 7).

In 506, a determination is made whether the connection manager service 266 (FIG. 7) is indicating that the communications link between the communications platform and the remote communications node is up. If so, the method proceeds to 508; else it goes to 507.

In 507, the method continues to check whether the connection manager service 266 has indicated that the communications link is up yet.

In 508, the service framework locates the remote service backend on the remote communications node 300.

In 510, the service framework 235 (FIG. 7) notifies the remote service frontend that the remote service backend is on the remote communications node 300. This can be done by remote lookup daemon 260 (FIG. 7).

In 512, the remote service frontend communicates with the remote service backend, e.g. exchanging parameters.

In 514, the remote service frontend registers the remote service in the service registry 250 (FIG. 7).

In 516, the service-requesting entity is notified that the remote service is registered in the service registry 250 (FIG. 7). This notification is via an event generated by event delivery daemon 252 (FIG. 7).

In 518, a suitable program module associated with the service-requesting entity listens for an event notification from event delivery daemon 252 and then invokes the remote service. To the service-requesting entity, the remote service appears indistinguishable from a local service.

In 520, a determination is made whether the connection manager service 266 is indicating that the communications link between the communications platform 200 and the remote communications node 300 is inactive or down. If so, the method proceeds to 522; else, it goes to 521.

In 521, the remote service remains available to this service-requesting entity, as well as to any other service-requesting entities that have subsequently requested it since it became available on the communications platform 200.

In 522, the remote service frontend unregisters the remote service in the service registry 250.

The various elements illustrated in FIGS. 1–7 are merely representational and are not drawn to scale. Certain proportions thereof may be exaggerated, while others may be minimized. The drawings are intended to illustrate various implementations of the invention that can be understood and appropriately carried out by those of ordinary skill in the art. Any arrangement, which is calculated to achieve the same purpose, may be substituted for the specific embodiments shown.

The sequences and methods shown and described herein can be carried out in a different order than those described. It will also be understood that while certain flowcharts in FIGS. 8–12 have an "End" block, in general the methods that they depict are continuously performed. The particular sequences, functions, and operations depicted in FIGS. 8–12 are merely illustrative of one or more embodiments of the invention, and other implementations will be apparent to those of ordinary skill in the art.

Conclusion

What have been described are methods and apparatus for providing a service framework within a wireless information appliance system that provides a standard, consistent, simplified way for services to make themselves available and for service-using entities to locate and connect with the services of interest to them.

The methods and apparatus of the present invention support the identification and connection of services to which user equipment can be readily coupled without unduly expending power, memory, bandwidth, and other resources available to the user equipment.

The present invention provides an innovative way to implement dynamic networking for managing distributed and transient services. It does so in a manner that offers a high degree of security. It completely eliminates the dynamic downloading of the service code and its execution in the client. The asymmetric lookup/advertising/discovery of services increases client privacy.

The implementing platform is extremely light-weight due to eliminating the downloading of service code, eliminating object serialization and remote method invocation (RMI), performing asymmetric lookup/advertising/discovery of services, performing just-in-time lookups of required services, and consolidating lookup activities by the local lookup services.

Support is provided for life-cycle management of the part of the distributed service on the client, including hot-upgrades, in the service interface.

Communication is minimized between the wireless client and server for administrative functions by eliminating downloading of service code, eliminating object serialization and RMI, performing just-in-time lookups, and batching lookup requests.

The consolidation of similar services is performed through the use of the "hidden" service feature.

The inheritance of attributes supports a hierarchical service tree that is useful for constraining lookup.

The implementation of the invention is language-independent, both on the client and on the server.

The present invention is conserving of application and platform resources, particularly in mobile platforms. The present invention makes all services appear the same to applications and platform resources, irrespective of where the services reside. It also insulates applications from the complexities of interacting with remote servers to connect with remote services through the use of a local proxy that represents a remote service as a local service.

The methods and apparatus described herein are quite versatile and can be implemented in any type of information appliance system. As described herein, the advantages of the present invention will be apparent to those of skill in the art and will provide improved methods and apparatus for locating, connecting with, and utilizing wireless services.

While the invention has been described in terms of specific examples, it is evident that many alternatives and variations will be apparent to those skilled in the art based on the description herein, and it is intended to include such variations and alternatives in the claims.

What is claimed is:

1. In a communications platform comprising a service-requesting entity, a consolidating service, and an interface with which a remote communications node can be coupled to the communications platform the remote communications node comprising a plurality of remote services, the method comprising:

the consolidating service locating, connecting with, and consolidating the plurality of remote services;

designating one of the remote services as a hidden service;

the service-requesting entity requesting access to the hidden service;

the consolidating service granting access by the service-requesting entity to the hidden service if the service-requesting entity specifies the hidden service be considered; and representing the hidden service on the communications platform only by a proxy.

2. The method recited in claim 1, wherein the proxy comprises a remote service frontend.

3. The method recited in claim 2, wherein the communications platform comprises a connection manager service to indicate when the interface is active or not, and wherein the remote service comprises the remote service frontend residing on the communications platform and a remote service backend residing on the remote communications node.

4. The method recited in claim 3, wherein the communications platform comprises a remote service event notification registry, the method further comprising:

the remote service frontend registering a notification request for the remote service backend in the remote service event notification registry.

5. The method recited in claim 4, the method further comprising:

the connection manager service indicating that the interface is active; and notifying the remote service frontend that the remote service backend is on the remote communications node.

6. The method recited in claim 5, the method further comprising:

the remote service frontend communicating with the remote service backend.

7. The method recited in claim 6, wherein the communications platform comprises a service registry, the method the comprising:

the remote service frontend registering the remote service in the service registry.

8. The method recited in claim 7, the method further comprising:

notifying the service-requesting entity that the remote service is registered in the service registry; and the service-requesting entity invoking the remote service.

9. The method recited in claim 8, wherein the communications platform comprises at least one local service, and wherein the at least one local service and the remote service appear indistinguishable to the service-requesting entity.

10. The method recited in claim 8, the method further comprising:

the connection manager service indicating that the interface is inactive; and the remote service frontend unregistering the remote service in the service registry.

11. A computer-readable medium containing computer instructions for instructing a processor to perform a method of operating a communications platform comprising a service-requesting entity, a consolidating service, and an interface with which a remote communications node can be coupled to the communications platform, the remote communications node comprising a plurality of remote services, the instructions comprising:

the consolidating service locating, connecting with, and consolidating the plurality of remote services;

designating one of the remote services as a hidden service;

the service-requesting entity requesting access to the hidden service;

the consolidating service granting access by the service-requesting entity to the hidden service if the service-requesting entity specifies the hidden service be considered; and representing the hidden service on the communications platform only by a proxy.

12. The computer-readable medium recited in claim 11, wherein the proxy comprises a remote service frontend, wherein the remote service comprises the remote service frontend residing on the communications platform and a remote service backend residing on the remote communications node, the instructions further comprising:

the remote service frontend communicating with the remote service backend when the interface is active.

13. The computer-readable medium recited in claim 12, the instructions further comprising:

notifying the service-requesting entity that the remote service is available; and the service-requesting entity invoking the remote service.

14. The computer-readable medium recited in claim 13, the instructions further comprising:

the remote service frontend not communicating with the remote service backend when the interface is inactive.

15. The computer-readable medium recited in claim 13, the instructions further comprising:

the remote service frontend indicating to the service-requesting entity that the remote service is unavailable if the interface becomes inactive.

* * * * *